(12) United States Patent
Keating et al.

(10) Patent No.: US 7,068,810 B2
(45) Date of Patent: Jun. 27, 2006

(54) METHODS AND APPARATUS FOR EMBEDDING DATA AND FOR DETECTING AND RECOVERING EMBEDDED DATA

(75) Inventors: Stephen Mark Keating, Reading (GB); Jason Pelly, Reading (GB); Daniel Warren Tapson, Basingstoke (GB); Morgan William Amos David, Farnham (GB); Jonathan James Stone, Reading (GB)

(73) Assignee: Sony United Kingdom Limited, Weybridge (GB)

( * ) Notice: Subject to any disclaimer, the term of this patent is extended or adjusted under 35 U.S.C. 154(b) by 745 days.

(21) Appl. No.: 10/006,645

(22) Filed: Dec. 6, 2001

(65) Prior Publication Data

US 2002/0122566 A1    Sep. 5, 2002

(30) Foreign Application Priority Data

Dec. 7, 2000  (GB) ................................ 0029856.2
Dec. 7, 2000  (GB) ................................ 0029857.0

(51) Int. Cl.
*G06K 9/00*   (2006.01)

(52) U.S. Cl. ....................................... 382/100; 713/176
(58) Field of Classification Search ................ 382/100; 713/176; 370/538–539
See application file for complete search history.

(56) References Cited

U.S. PATENT DOCUMENTS 5,930,369 A     7/1999   Cox et al.
6,522,672 B1 *  2/2003   Matsuzaki et al. .......... 370/539

(Continued)

FOREIGN PATENT DOCUMENTS

EP          0 461 787         12/1991

(Continued)

OTHER PUBLICATIONS

C. Valens, "A Really Friendly Guide to Wavelets", 1999 (c.valens@mindless.com).

(Continued)

*Primary Examiner*—Joseph Mancuso
*Assistant Examiner*—Craig Kronenthal
(74) *Attorney, Agent, or Firm*—Oblon, Spivak, McClelland, Maier & Neustadt, P.C.

(57)    ABSTRACT

An apparatus for embedding data in information material, the data being a plurality of data items each having a different relative importance. The apparatus comprises an encoding processor operable to encode each of said data items, and a combining processor operable to combine said encoded data items with said information material. The information material provides a limited data embedding capacity, as a result for example of the limited bandwidth of the information material itself. Each of the data items are encoded and embedded to the effect that a proportion of the limited data embedding capacity is allocated to the encoded data items in accordance with the relative importance of these data items. As such, for example, an amount of error protection given to each of the data items can be arranged in accordance with the importance of the data items, whilst still satisfying the limited data embedding capacity. Accordingly, a greater amount of protection can be provided to the more important data items, thereby making these items more robust with respect to any processing of the information material and more likely to be recovered correctly.

62 Claims, 9 Drawing Sheets

U.S. PATENT DOCUMENTS

| | | | |
|---|---|---|---|
| 6,590,996 B1 * | 7/2003 | Reed et al. | 382/100 |
| 6,622,004 B1 * | 9/2003 | Sonoda et al. | 455/3.05 |
| 6,671,387 B1 * | 12/2003 | Chen et al. | 382/100 |
| 6,704,431 B1 * | 3/2004 | Ogawa et al. | 382/100 |
| 6,807,285 B1 * | 10/2004 | Iwamura | 382/100 |
| 2002/0154699 A1 * | 10/2002 | Yamaguchi et al. | 375/240.25 |

FOREIGN PATENT DOCUMENTS

| | | |
|---|---|---|
| EP | 0840513 | 5/1998 |
| EP | 0 877 528 | 11/1998 |
| EP | 0 913 952 | 5/1999 |
| EP | 1032205 | 8/2000 |
| GB | 2 348 585 | 10/2000 |
| JP | 2000187441 | 7/2000 |
| WO | WO 00 72321 | 11/2000 |

OTHER PUBLICATIONS

SMPTE Journal, *Proposed SMPTE Standard for Television—Unique Material Identifier (UMID)*, vol. 109, No. 3, Mar. 2000, pp. 221-225.

Wilkinson J H et al: "Tools and Techniques for Globally Unique Content Indentification", SMPTE Journal, SMPTE Inc. Scarsdale, N.Y., US, vol. 109, NR. 10, pp. 795-799, XP000969315 ISSN: 0036-1682.

Bender W et al: "Techniques for Data Hiding" IBM Systems Journal, IBM Corp. Armonk, New York, US, vol. 35, No. ¾, 1996, pp. 313-335, XP000635079 ISSN: 0018-8670.

* cited by examiner

BASIC AND EXTENDED UMID STRUCTURES

METHODS AND APPARATUS FOR EMBEDDING DATA AND FOR DETECTING AND RECOVERING EMBEDDED DATA

FIELD OF INVENTION

The present invention relates to methods and apparatus for embedding data in material information and methods and apparatus for detecting and recovering data embedded in information material.

Information material as used herein refers to and includes one or more of video material, audio material and data material. Video material in this context may be still images or moving images.

BACKGROUND OF INVENTION

Steganography is a technical field relating to the embedding of data into material such as video material, audio material and data material in such a way that the data is imperceptible in the material.

Watermarks are data embedded in material such as video material, audio material and data material. A watermark may be imperceptible or perceptible in the material.

A watermark may be used for various purposes. It is known to use watermarks for the purpose of protecting the material against, or trace, infringement of the intellectual property rights of the owner(s) of the material. For example a watermark may identify the owner of the material.

Watermarks may be "robust" in that they are difficult to remove from the material. Robust watermarks are useful to trace the provenance of material which is processed in some way either in an attempt to remove the mark or to effect legitimate processing such as video editing or compression for storage and/or transmission. Watermarks may be "fragile" in that they are easily damaged by processing which is useful to detect attempts to remove the mark or process the material.

Visible watermarks are useful to allow, for example, a customer to view an image via, for example, the Internet to determine whether they wish to buy it but without allowing the customer access to the unmarked image they would buy. The watermark degrades the image and the mark is preferably not removable by the customer. Visible watermarks are also used to determine the provenance of the material into which they are embedded.

In U.S. Pat. No. 5,930,369 (Cox et al) it has been proposed to embed data into material such as images to form a watermark by converting the material into the transform domain and adding the data to the image in the transform domain. For the example of images and the Discrete Wavelet Transform of these images, the data to be embedded can be combined with the wavelet coefficients of one of a plurality of sub-bands which are formed in the transform domain. Generally, the data to be embedded is arranged to modulate a predetermined data sequence such as a Pseudo Random Bit Sequence (PRBS). For example, each bit of the data to be embedded is arranged to modulate a copy of the PRBS, and this copy is then added, for example into one of the sub-bands of the image in the transform domain. The image is then converted back to the spatial domain.

If it is desired to detect and recover the embedded data from the image, the image is converted back to the transform domain and the embedded data is recovered from the sub-band in the transform domain by correlating the transform coefficients in the sub-band with the PRBS which is known to the detecting apparatus. The data is detected from the result of the correlation.

Generally, it is desirable to reduce to a minimum any perceivable effect that the embedded data may have on the information material such as images. However it is also desirable to increase the likelihood of correctly recovering the embedded data from the information material, in spite of errors which may be introduced as a result of any processing which may be performed on the material.

SUMMARY OF INVENTION

According to an aspect of the present invention there is provided an apparatus for embedding data in information material, the data being a plurality of data items each having a different relative importance, the apparatus comprising an encoding processor operable to encode each of the data items, a combining processor operable to combine the encoded data items with the information material, wherein the information material provides a limited data embedding capacity, and each of the data items are encoded and embedded to the effect that a proportion of the limited data embedding capacity is allocated to the data items in accordance with the relative importance.

Embedding data in information material such as images can present a compromise between increasing the likelihood of recovering the embedded data, requiring a higher strength with which the data is embedded, and reducing the likelihood of the embedded data causing a visually perceivable effect to the image. This compromise in addition sets a limit on the amount of data which can be embedded in the information material, because too much embedded data may cause a perceivable degradation on the material and reduce a likelihood of correctly recovering the data. Furthermore, a limit on the amount of data which can be embedded in the information material may exist as a result of a physical limit on the bandwidth of the information material itself. For the example of information material such as images which are typically divided into frames of image data, there will be a physical limit on the amount of data in the image frame, and therefore a corresponding limit on the amount of data which can be embedded. This is particularly true if the data items are embedded in the image by modulating a PRBS and adding the modulated PRBS to the image material in either a transform domain representation of the image or a spatial domain representation of the image. This is because modulating the PRBS with the data to be embedded generates a spread spectrum signal representing a significantly increased amount of data to be added to the information material.

The data to be embedded into the information material may comprise a plurality of data items. Typically, some data items may be more important than other data items. For the example in which the information material is video images, and the data items to be embedded in the video images comprise meta data items describing the content or some attributes of the images, the owner of the image may represent the most important meta data. Other meta data such as the location at which the video images were generated or a transcript of the dialogue, may represent less important meta data.

Embodiments of the present invention address a technical problem of embedding data items of different relative importance within a limited data embedding capacity of the information material. To this end, the encoding processor and the embedding processor are operable to adjust an amount of coding and/or adjust the embedding of the data to the effect that the more important data items are afforded greater protection within the limited embedding data capacity, providing a greater likelihood of correctly recovering the data. The more important data items may therefore acquire a greater proportion of the available capacity than less important data items.

In preferred embodiments, the encoding processor is operable to encode the data items in accordance with at least one error correction code, the encoded data items including redundant data introduced by the error correction code, wherein the combining processor is operable in combination with the encoding processor to allocate an amount of the limited bandwidth and to generate an amount of the redundant data included in the encoded data fields in accordance with the relative importance. According to this embodiment the relative allocation of the limited embedding capacity is made in accordance with importance, by increasing the amount of redundancy afforded to the more important data. This can be effected, for example, by providing a separate error correction code to each item of data, the power of the allocated code being arranged in accordance with the relative importance of the data items concerned. Correspondingly the more powerful code will generate a greater amount of redundant data, and therefore occupy more of the limited embedding capacity. Accordingly, the error correction codes are also selected to the effect that the total quantity of data from the encoded data items can be accommodated within the limited data embedding capacity.

In an alternative embodiment the combining processor may be operable to embed the data items in accordance with an application strength, the application strength being applied in proportion with the relative importance of the data items. As such, the more important data will be more likely to be recovered albeit at the expense of an increased likelihood of any perceptual effects on the information material. The encoding processor may modulate a predetermined data sequence such as a PRBS in order to form an encoded version of the data which is then embedded in accordance with the proportioned application strength. Accordingly any visually perceivable effects of the embedded data may be reduced.

In an alternative embodiment, the encoding processor may operate to generate a plurality of predetermined data sequences and to encode the data items by modulating a copy of the predetermined data sequences with data symbols of the data items, and to combine the modulated predetermined data sequences with the information material, wherein predetermined data sequences are allocated to the effect that a greater amount of spreading is provided to the more important data items, thus providing an allocation of the embedding capacity.

Embedding the data items by generating predetermined data sequences, such as PRBSs, modulating the predetermined data sequences with the data to be embedded and combining the modulated data sequences with the information material has a effect of generating a spread spectrum signal for the embedded data. As such, generating a plurality of such sequences for bearing the data items provides a facility for allocating more capacity for embedding data to the more important data items. This can be effected by either allocating a greater number of data sequences to the more important data or allocating longer data sequences to the more important data items. This is because a detector for recovering the embedded data can recover the data by correlating the data embedded information material with a re-generated version of the corresponding predetermined data sequence to recover the data. It is a property of predetermined data sequences such as PRBSs that the other PRBSs used to embed other data items will appear as noise to the PRBS of the data being detected.

According to an aspect of the present invention there is provided an apparatus for detecting and recovering data embedded in information material, the data comprising a plurality of source data items each having been encoded in accordance with a systematic error correction code to produce encoded data items each comprising the corresponding source data item and redundant data, the encoded data items being embedded in the information material, the apparatus comprising an embedded data detector operable to detect and generate a recovered version of the encoded data from the information material, an error processor operable, for each of the recovered encoded data items, to determine whether the recovered encoded data item is deemed too errored, and if not, decoding the encoded data item to generate a recovered version of the data item, a data store for storing the recovered version of the data item, and a recovery data processor operable, if the error processor determines that one of the recovered encoded data items is deemed too errored, to compare the source data item of the encoded data item, with at least one other source data item from the data store, and to estimate the source data item of the errored encoded data item in dependence upon a corresponding value of the at least one other recovered data item.

The term systematic code is a term used in the technical field of error correction coding to refer to an error correction code or encoding process in which the original source data appears as part of the encoded data in combination with redundant data added by the encoding process. For a non-systematic encoding process, the input data does not appear as part of the encoded data.

Embodiments of the present invention address a technical problem of recovering data embedded in information material, when errors have been introduced into the data as a result for example of the embedding process, or as a result of processes performed on the information material in which the data is embedded. For the example of information material such as images, data is embedded into the images so that the effect of the embedded data is difficult to perceive and is as far as possible imperceptible. As such the strength with which the data is embedded is reduced to a minimum level which is still sufficient to ensure that the data can be recovered from the image. However, if the image is processed in some way, such as if the image is compression encoded, errors may be introduced into the embedded data as a result of the compression encoding process. This is because, typically an effect of compression encoding is to alter or discard components of the image. These components may be bearing the embedded data. In addition, inaccuracies as a result for example of quantization errors may be present when detecting and recovering the embedded data, further contributing to errors in the recovered data.

It is known to protect against errors by encoding data using an error correction code. Error correction encoded data typically can be used to correct a certain number of errors in each encoded data word and typically to detect a greater number of errors in each encoded data word.

Embodiments of the present invention utilise systematic codes in which the data items to be embedded appear as part of the error correction encoded form of the data items. Typically, the data items to be embedded may be correlated in some way. As such, if an encoded data item is deemed too errored and therefore not recoverable by error correction decoding, the data item may be recovered from the errored encoded data item, by comparing the data item with at least one other recovered data item, and estimating the data item in accordance with a correlation between the recovered data items.

A recovered encoded data item may be deemed too errored, if the error processor is operable to determine the number of errors in the encoded data item, and to compare the number of errors with a predetermined threshold. If the number of errors is greater than the threshold, then the encoded data item is deemed to have too many errors, which are safe to decode. Alternatively, the error correction decoding process performed by the error processor may provide an indication, as part of this process that the encoded data item cannot be recovered because there are too many errors.

Although the errored data item may be recovered from one other recovered data item, in preferred embodiments, the errored data item may be recovered by comparing the errored data item with a previous and a subsequent recovered data item. The errored data item may be recovered by interpolating between the previous and subsequent data items, if these data items are different, or replacing the value of the errored data item to be recovered with the values of the previous and subsequent data items if they are the same.

Although embodiments of the present invention find application in recovering any data items which have been error correction encoded and embedded into information material, in preferred embodiments, the data items have a plurality of data fields. Accordingly, in preferred embodiments the recovery processor may be operable to compare at least one of the data fields, for an errored encoded data item which cannot be decoded, with the corresponding field of at least one of a previous and a subsequent data item, and to replace the data field of the errored encoded data item in accordance with the corresponding data field of one of the previous and subsequent data items. The data field may be replaced with the value of the corresponding data field of one of the previous and the subsequent data items, if the data fields of the previous and subsequent data items are the same, or may be replaced by a value determined by interpolating between the value of the corresponding data field of the previous and subsequent data items.

After replacing the data field of the encoded data item which is deemed to be too errored, the recovery processor is operable to determine in combination with the error processor whether the recovered encoded data item in which the data field is replaced is deemed to be too errored, and if not, decoding the encoded data item to form a recovered version of the data item. It is likely that the errors in the encoded data item will be distributed throughout this data item, so that by replacing the data field with a value determined from the already decoded data items, at least some of these errors may have been corrected. As such, the number of errors in the adapted encoded data item may now be a number, which can be corrected by error correction decoding. The error processor is therefore arranged to that effect of re-applying error correction to the effect of recovering the entire data item, if the encoded data item is deemed to be recoverable.

In preferred embodiments the data items may be meta data representative of the content of the information material. For example the data items may be Universal Material Identifiers (UMIDs), the data fields being the data fields of the UMIDs.

Although embodiments of the invention find application in detecting and recovering data from any information material, a particular application of the invention is in detecting and recovering data embedded in video image or audio signals.

Various further aspects and features of the present invention are defined in the appended claims.

DESCRIPTION OF PREFERRED EMBODIMENTS

An example embodiment of the present invention will be described with reference to a watermarking system in which data is embedded into a video image. Any type of data can be embedded into the image. However, advantageously the data embedded into the image may be meta data which describes the image or identifies some attributes of the content of the image itself. One example of meta data is the Unique Material Identifier (UMID). A proposed structure for the UMID is disclosed in SMPTE Journal March 2000. A more detailed explanation of the structure of the UMID will be described later.

Watermarking System

Figure 1:
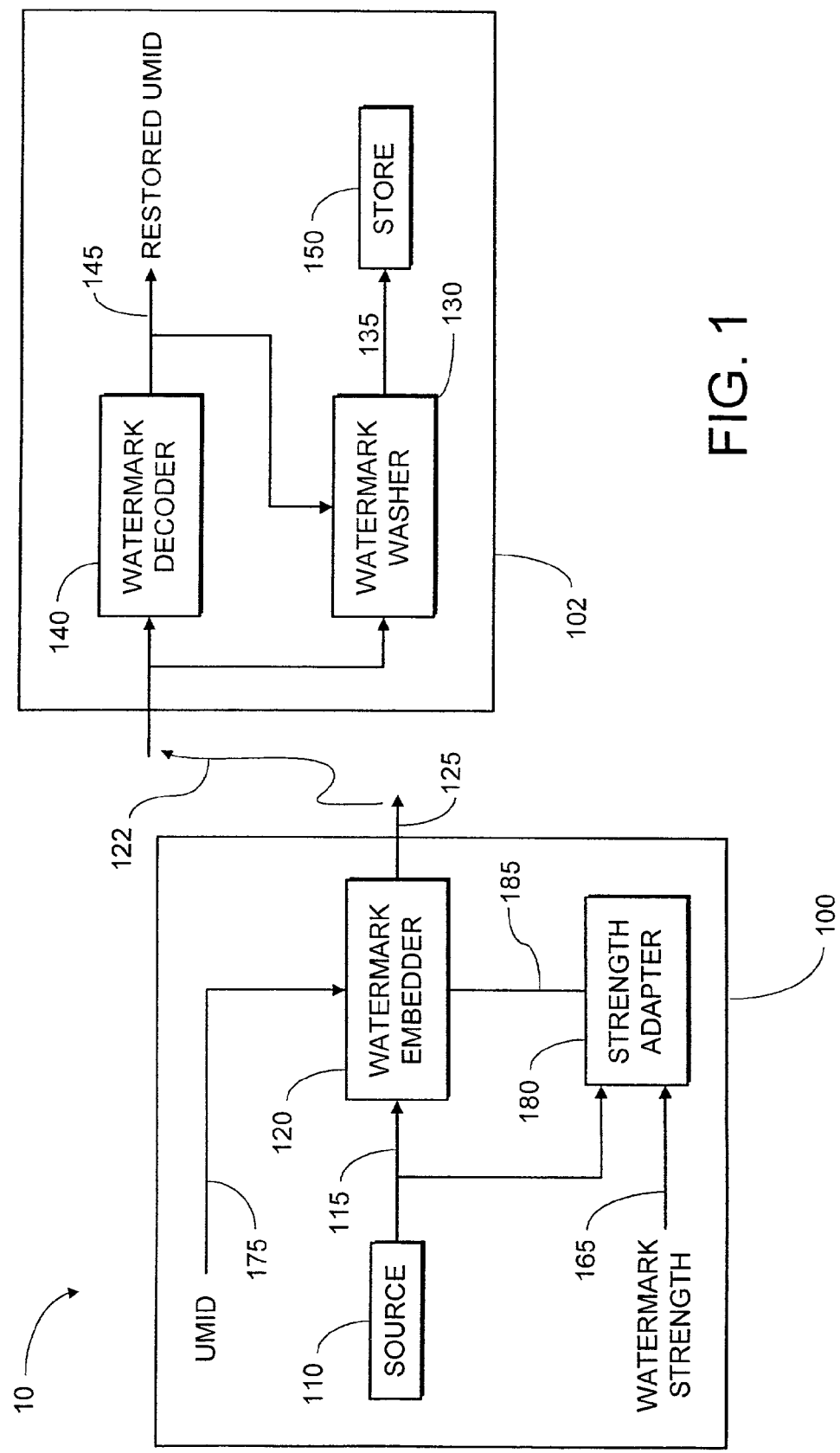
FIG. 1 is a schematic block diagram of a watermarking system.

FIG. 1 illustrates a watermarking system, generally 10, for embedding a watermark into a video image 115, and recovering and removing a watermark from the watermarked video image 125. The watermarking system 10 in FIG. 1 comprises an image processor 100 for embedding the watermark into the video image, and a decoding image processor 102 for detecting and recovering the watermark, and for removing or 'washing' the watermark from the video image.

The image processor 100 for embedding the watermark into the video image comprises a strength adapter 180, and a watermark embedder 120. The watermark embedder 120 is arranged to embed the watermark into the video image 115, produced from the source 110, to form a watermarked image 125. The watermark to be embedded into the video image is formed from data 175. The data may represent for one example various items of meta data. In another example, the data may be a UMID. Generally, the meta data items identify the content of the video image. It will be appreciated that various types of meta data which identify the content or other attributes of the image can be used to form the watermark. In preferred embodiments the watermark embedder 120 embeds the meta data items into the video image 115 in accordance with a particular application strength 185 from the strength adapter 180. The strength adapter 180 determines the magnitude of the watermark in relation to the video image 115, the application strength being determined such that the watermark may be recovered whilst minimising any effects which may be perceivable to a viewer of the watermarked image 125. After embedding the watermark, the image may be transmitted, stored or further processed in some way, such as for example, compression encoding the image. This subsequent processing and transmitting is represented generally in FIG. 1 as line 122.

In FIG. 1 the decoding image processor 102 for detecting and removing the watermark is shown as comprising a watermark decoder 140, a data store 150 and a watermark washer 130 which removes the watermark from the watermarked image 125.

The watermark decoder 140 detects the watermark from the watermarked video image and in the present example embodiment, generates a restored version of the meta data items 145 from the watermarked image 125. The watermark washer 130 generates a restored image 135, by removing as far as possible the watermark from the watermarked image 125. In some embodiments, the watermark washer 130 is operable to remove the watermark from the image substantially without leaving a trace. The restored image 135 may then be stored in a store 150, transmitted or routed for further processing.

The Watermark Embedder

Figure 2:
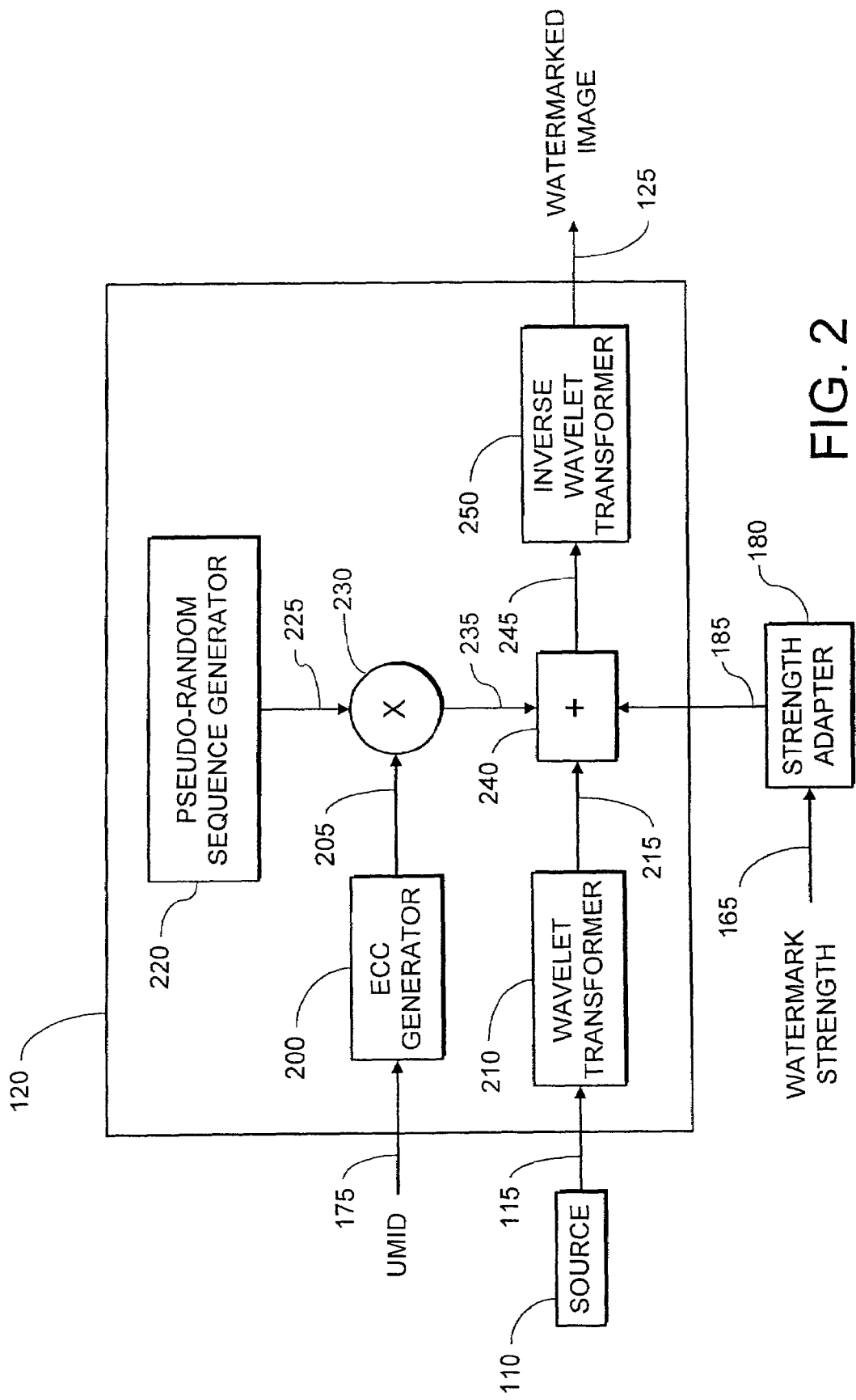
FIG. 2 is a schematic block diagram of a watermark embedder appearing in FIG. 1.

The watermark embedder will now be described in more detail with reference to FIG. 2, where parts also appearing in FIG. 1 have the same numerical references. In FIG. 2 the watermark embedder 120 comprises a pseudo-random sequence generator 220, an error correction encoder 200, a wavelet transformer 210, an inverse wavelet transformer 250, a modulator 230 and a combiner 240.

Error Correction Encoder According to a First Embodiment

Figure 3:
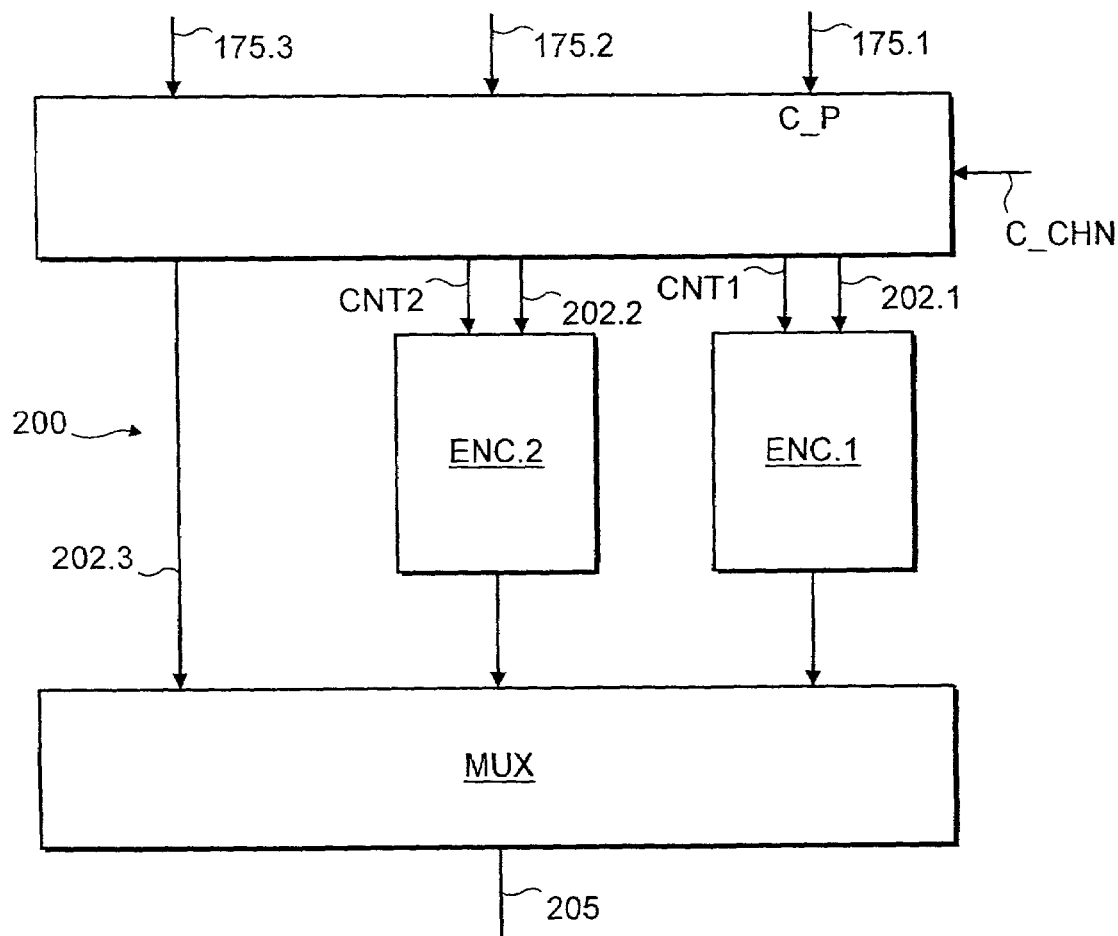
FIG. 3 is a schematic block diagram of an error correction encoder forming part of the watermark embedder shown in FIG. 2.

The error correction encoder 200 providing a first embodiment of the present invention will now be explained in more detail. In FIG. 3 an example of an error correction encoder is shown where parts also appearing in FIGS. 1 and 2 bear identical numerical references. As shown in FIG. 3 the data to be encoded and embedded in the video images is received via parallel conductors 175.1, 175.2, 175.3 each of which conveys meta data of a different type.

The example embodiment will be illustrated with reference to three types of meta data. The three types of meta data are provided on the three parallel conductors 175.1, 175.2, 175.3. As will be appreciated there are various types of meta data which are generally associated or describe the content of the video image signals. The meta data may be on one channel a UMID or on other channels a location, time, identification of the owner, transcripts of the dialogue conducted as represented in the video image or various other types of meta data.

As shown in FIG. 3, the three types of meta data are received by a control processor C_P. The three types of meta data are to be encoded and embedded in the video image. These meta data types are on the first channel 175.1 the type of program content of the video images, for example current affairs, comedy, sport or light entertainment, on the second channel 175.2, a transcript of the discussion between people contained in the video images, such as an interviewer and interviewees and on the third channel 175.3 the camera settings used in capturing the video images.

For the example embodiment illustrated in FIG. 3 the three meta data types are considered to be presented in an increasing order of importance as going from left to right across the control processor C_P. The control processor C_P may also receive control information via a control channel C_CHN which may indicate an amount of data embedding capacity available to the three meta data types. Furthermore, in alternative embodiments the control channel C_CHN may convey control information indicative of a relative importance of the meta data received on the respective input channels 175.1, 175.2, 175.3. Alternatively, as with the present illustration, the relative importance may be predetermined, that is to say, the order of importance of the meta data types may be predetermined and therefore fed to the control processor C_P on the respective parallel channels in an increasing order of importance.

The control processor C_P determines a relative allocation of the embedded data capacity to the three meta data types, in accordance with their relative importance. The protection afforded to each of these types is allocated in accordance with this relative importance. As a result, the program type meta data received on the first channel 175.1 is fed to a first encoder ENC.1 via a connecting channel 202.1. The encoder ENC.1 operates to encode the first type of meta data in accordance with an error correction code either selected by the control processor C_P and indicated from control signals received from a control channel CNT.1 or an error correction code which is pre-allocated. For example, the error correction code could be a block code providing approximately a one third coding rate, that is a ratio of source data to encoded data is 1:3 (rate ⅓). The second meta data type is fed to a second encoder ENC.2 via a second connecting channel 202.2.

As with the first encoder the second type of data fed to the second encoder ENC.2 is error correction encoded in accordance with either a predetermined error correction code or a correction code identified by control information received on the control channel CNT.2. Accordingly, the relatively reduced importance of the second type of meta data is used to pre-allocate or select an error correction code applied by the second encoder ENC.2 which is less powerful than that applied by the first encoder ENC.1. As such, the amount of redundant data added to the meta data items in the encoded form will be reduced in comparison to the first encoder ENC.1. For example, the second encoder ENC.2 may operate in accordance with a half rate code.

For the third type of meta data received on the third channel 175.3, the control processor for the present example does not apply any coding to this data so that the meta data items from the third type are fed via a connecting channel 202.3 to a multiplexing unit MUX. The multiplexing unit MUX combines the data items from the third meta data type with the encoded data items received from the first and second encoder ENC.1, ENC.2 and forms a multiplexed data stream which is fed on the connecting channels 205 to the combiner 230 as shown in FIG. 2.

It will be appreciated that the present invention is not limited to any particular error correction encoding scheme, so that for example a Bose-Chaudhuri-Hocquenghem (BCH) code, Reed-Solomon codes or convolutional codes could be used to encode the UMIDs. For the case of convolutional codes, the data could be encoded using the same convolutional code and punctured in order to reflect the relative importance of the data.

As indicated above in alternative embodiments the relative importance of the meta data received on the parallel channels 175 may be unknown to the encoder 200. However in this case the relative importance of the meta data types will be fed to the controller processor C_P via the control channel C_CHN. This relative importance may be input by a user or may be pre-selected in accordance with a predetermined menu option. Similarly, the amount of data embedding capacity available to the control processor C_P maybe unknown or may vary dynamically. Accordingly, in alternative embodiments the control processor C_P is operable to determine the amount of encoding applied to the respective meta data items in accordance with their relative importance such that the data items can be encoded within the limited embedding capacity available. However, with this alternative embodiment, it may be necessary to embed control data indicative of the error correction code used to encode each of the meta data items. In addition, an indication of the position of each of the encoded meta data items for each meta data type may be embedded within the encoded data stream.

Error Correction Encoder According to a Second Embodiment

Figure 4:
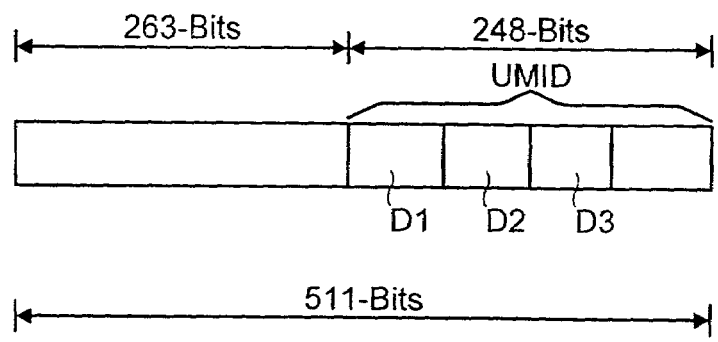
FIG. 4 is a schematic representation of a UMID encoded by the error correction encoder shown in FIG. 2, using a systematic error correction code.

The error correction encoder 200 providing a second embodiment of the present invention receives the meta data items 175 and generates error correction encoded data. In one example, the error correction encoded data may comprise redundant data in combination with the UMID provided as watermark data 175. It will be appreciated that various error correction encoding schemes could be used to encode the UMID. However, in accordance with an embodiment of the present invention, the error correction code which is used by the error correction encoder 200 to encode the UMID is a systematic code. For the example embodiment the systematic code is a Bose-Chaudhuri-Hocquenghem (BCH) code providing 511 bit codewords comprising 248 source bits of the UMID and 263 bits of redundant parity bits. This is represented in FIG. 4 where the UMID is illustrated as having only three data fields although as will be explained shortly these are just an example of three of the data fields which appear in the UMID. These data fields D1, D2, D3 will be used to illustrate the example embodiment of the present invention.

It will be appreciated that the present invention is not limited to any particular error correction encoding scheme, so that other BCH codes, or for example Reed-Solomon codes or convolutional codes could be used to encode the UMIDs. However, the encoding scheme should be arranged to encode the data items (UMIDs) in accordance with systematic codes, wherein the source data appears with redundant data added by the encoding scheme in the encoded form.

Embedding Data Processor

As shown in FIG. 2 the error correction encoded meta data items 205 are received at a first input to the modulator 230. The pseudo-random sequence generator 220 outputs a PRBS 225 which is received at a second input to the modulator 230. The modulator 230 is operable to modulate each copy of a PRBS, generated by the pseudo-random sequence generator 220, with each bit of the error correction encoded meta data items. In preferred embodiments the data is modulated by representing the values of each bit of the PRBS in bipolar form ('1' as +1, and '0' as −1) and then reversing the polarity of each bit of the PRBS, if the corresponding bit of the encoded UMID is a '0' and not reversing the polarity if the corresponding bit is a '1'. The modulated PRBS is then received at a first input of the combiner 240. The combiner 240 receives at a second input the image in which the PRBS modulated data is to be embedded. However the data is combined with the image in the transform domain.

The use of a pseudo-random bit sequence 225 to generate the spread spectrum signal representing the watermark data allows a reduction to be made in the strength of the data to be embedded in the image. By correlating the data in the transform domain image to which the modulated PRBS has been added, a correlation output signal is produced with a so called correlation coding gain which allows the modulated data bit to be detected and determined. As such, the strength of the data added to the image can be reduced, thereby reducing any perceivable effect on the spatial domain image. The use of a spread spectrum signal also provides an inherent improvement in robustness of the image because the data is spread across a larger number of transform domain data symbols.

As shown in FIG. 2, the wavelet transformer 210 receives the video image 115 from the source 110 and outputs a wavelet image 215 to the combiner 240. The image is thus converted from the spatial to the transform domain. The combiner 240 is operable to add the PRBS modulated data to the image in the transform domain, in accordance with the application strength, provided by the strength adapter 180. The watermarked wavelet image 245 is then transformed into the spatial domain by the inverse wavelet transformer 250 to produce the watermarked image 125. The operation of the combiner 240 will be explained in more detail shortly.

The skilled person will be acquainted with the wavelet transform and variants. A more detailed description of the wavelet transform is provided in for example "A Really Friendly Guide to Wavelets" by C Valens, 1999 (c.valens@mindless.com).

Although, in the example embodiment of the present invention, the data is embedded in the image in the wavelet transform domain, it will be appreciated that the present invention is not limited to the wavelet transform. The example embodiment could be added to the image using any transform such the Discrete Cosine Transform or the Fourier Transform. Furthermore the data could be combined with the image in the spatial domain without forming a transform of the image.

Combiner

The operation of the combiner 240 will now be explained in more detail. The combiner 240 receives the wavelet image 215 from the wavelet transformer 210, and the modulated PRBS from the modulator 230 and the application strength 185 from the strength adapter 180. The combiner 240 embeds the watermark 235 onto the wavelet image 215, by adding, for each bit of the modulated PRBS a factor α scaled by ±1, in dependence upon the value of the bit. Selected parts of the wavelet image 215 are used to embed the watermark 235. Each pixel of the predetermined region of the wavelet image 215 is encoded according to the following equation:

$$X_i' = X_i + \alpha_n W_i \quad (1)$$

Where $X_i$ is the i-th wavelet coefficient, $\alpha_n$ is the strength for the n-th PRBS and $W_i$ is the i-th bit of the PRBS to be embedded in bipolar form.

Figure 5:
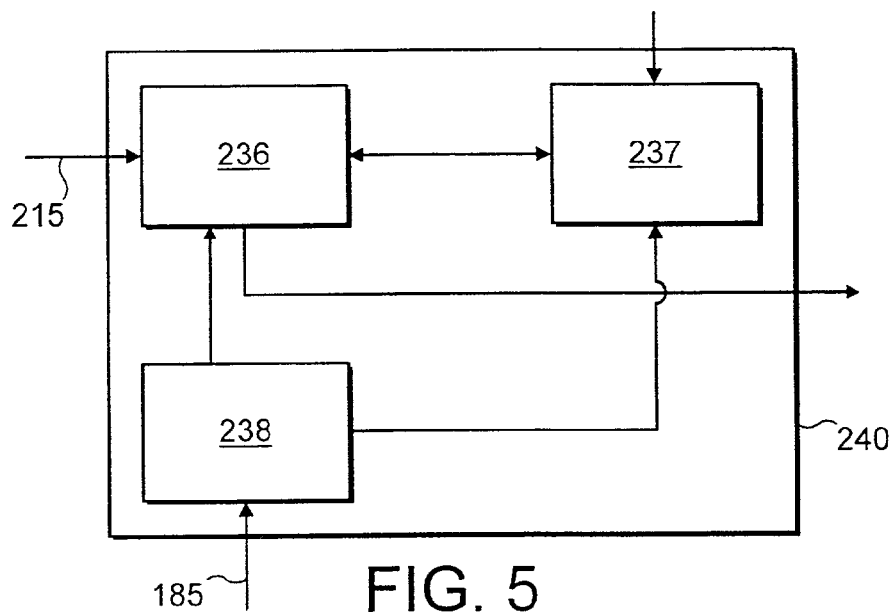
FIG. 5 is a schematic block diagram of a combiner forming part of the watermark embedder shown in FIG. 2.

An example of the combiner and the operation of the combiner will now be described with reference to FIGS. 5 and 6. In FIG. 5 the combiner 240 is shown to receive the transform domain image from the connecting channel 215 which provides the transform domain image to a frame store 236. The frame store 236 is arranged to store a frame of transform domain data. The combiner 240 is also arranged to receive the spread spectrum encoded and error correction encoded data after it has been spread using the PRBS (modulated PRBS data). For this example embodiment an amount of data in this error correction and spread spectrum encoded form is to be embedded in the frame of image data within the frame store 236. A limit on the amount of data which can be embedded is therefore set in accordance with the amount of data in the image frame, and the nature of the image to the extent that the image can withstand the effects of the embedded data. The encoded data forms a total amount of data which is to be embedded into each frame of image data within this capacity limit. To this end, the frame store stores a frame of data representing the image in the wavelet transform domain. The data to be embedded is received at a combining processor 237 which combines the data to be embedded into selected parts of the wavelet transform domain image stored in the frame store 236. The combiner 240 is also provided with a control processor 238, which is coupled to the combining processor 237. The control processor 238 receives the application strength from the strength adapter 180 and controls the combining of the modulated PRBS data with the information material, in accordance with the application strength, as expressed by equation (1) above. The control processor 238 is also arranged to monitor the available data embedding capacity, and then combine the modulated PRBSs with the information material in accordance with this available data embedding capacity. Signals representative of the available data embedding capacity may be communicated to other parts of the watermark embedder, such as, the control processor C_P of the error correction encoder shown in FIG. 3, or the modulator 230.

Figure 6:
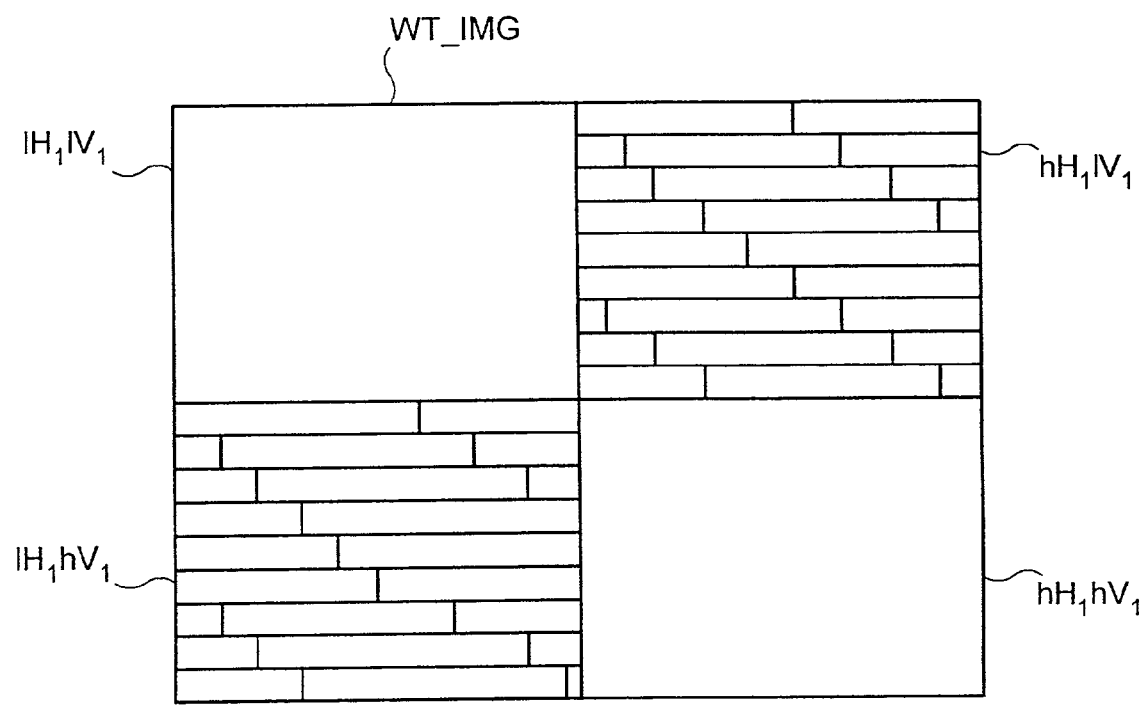
FIG. 6 provides an illustrative representation of a transform domain image with which data is combined.

In FIG. 6 an illustrative representation of a first order wavelet transform is presented. This wavelet transform is representative of a frame of the image transformed into the wavelet domain and stored in the frame store 236. The wavelet transform image WT_IMG is shown to comprise four wavelet domains representative of sub-bands into which the image has been divided. The wavelets comprise a low horizontal, low vertical frequencies sub-band $lH_1lV_1$, the high horizontal, low vertical frequencies sub-band $hH_1lV_1$, the low horizontal, high vertical frequencies sub-band $lH_1hV_1$ and the high horizontal, high vertical frequencies sub-band $hH_1hV_1$.

In the example embodiment of the present invention, the data to be embedded is only written into the high horizontal, low vertical frequencies sub-band $hH_1lV_1$ and the low horizontal, high vertical frequencies sub-bands labelled $lH_1hV_1$.

By embedding the data in only the two sub-bands $hH_1lV_1$, $lH_1hV_1$, the likelihood of detecting the embedded data is improved whilst the effects that the embedded data will have on the resulting image are reduced. This is because the wavelet coefficients of the high horizontal, high vertical frequencies sub-bands $hH_1hV_1$ are more likely to disturbed, by for example compression encoding. Compression encoding processes such as JPEG (Joint Photographic Experts Group) operate to compression encode images by reducing the high frequency components of the image. Therefore, writing the data into this sub-band $hH_1hV_1$ would reduce the likelihood of being able to recover the embedded data. Conversely, data is also not written into the low vertical, low horizontal frequencies sub-band $lH_1lV_1$. This is because the human eye is more sensitive to the low frequency components of the image. Therefore, writing the data in the low vertical, low horizontal frequencies sub-band would have a more disturbing effect on the image. As a compromise the data is added into the high horizontal, low vertical frequencies sub-band $hH_1lV_1$ and the low horizontal, high vertical frequencies sub-bands $lH_1hV_1$.

Decoder According to a First Embodiment

The operation of the watermark decoder 140 in the decoding image processor of FIG. 1, will now be explained in more detail, with reference to FIG. 7, where parts also appearing in FIG. 1, bear identical reference numerals. The watermark decoder 140 receives the watermarked image 125 and outputs a restored version of the UMID 145. The watermark decoder 140 comprises a wavelet transformer 310, a pseudo-random sequence generator 320, a correlator 330, and an error correction decoder 350. Optionally in alternative embodiments an analysis processor 360 may be provided as will be explained shortly.

The wavelet transformer 310 converts the watermarked image 125 into the transform domain so that the watermark data can be recovered. The wavelet coefficients to which the PRBS modulated data were added by the combiner 240 are then read from the two wavelet sub-bands $hH_1lV_1$, $lH_1hV_1$. These wavelet coefficients are then correlated with respect to the corresponding PRBS used in the watermark embedder. Generally, this correlation is expressed as equation (2), below, where $X_n$ is the n-th wavelet coefficient and $R_i$ is the i-th bit of the PRBS generated by the Pseudo Random Sequence Generator 320.

$$C_n = \sum_{i=1}^{s} X_{sn+1} R_i \quad (2)$$

The relative sign of the result of the correlation $C_n$ then gives an indication of the value of the bit of the embed data in correspondence with the sign used to represent this bit in the watermark embedder. The data bits recovered in this way represent the error correction encoded data which is subsequently decoded by the error correction decoder 350 as will be explained shortly. Having recovered the data items, the watermark can be removed from the video image by the watermark washer 130, by performing the reverse of the operations performed by the embedder.

Figure 7:
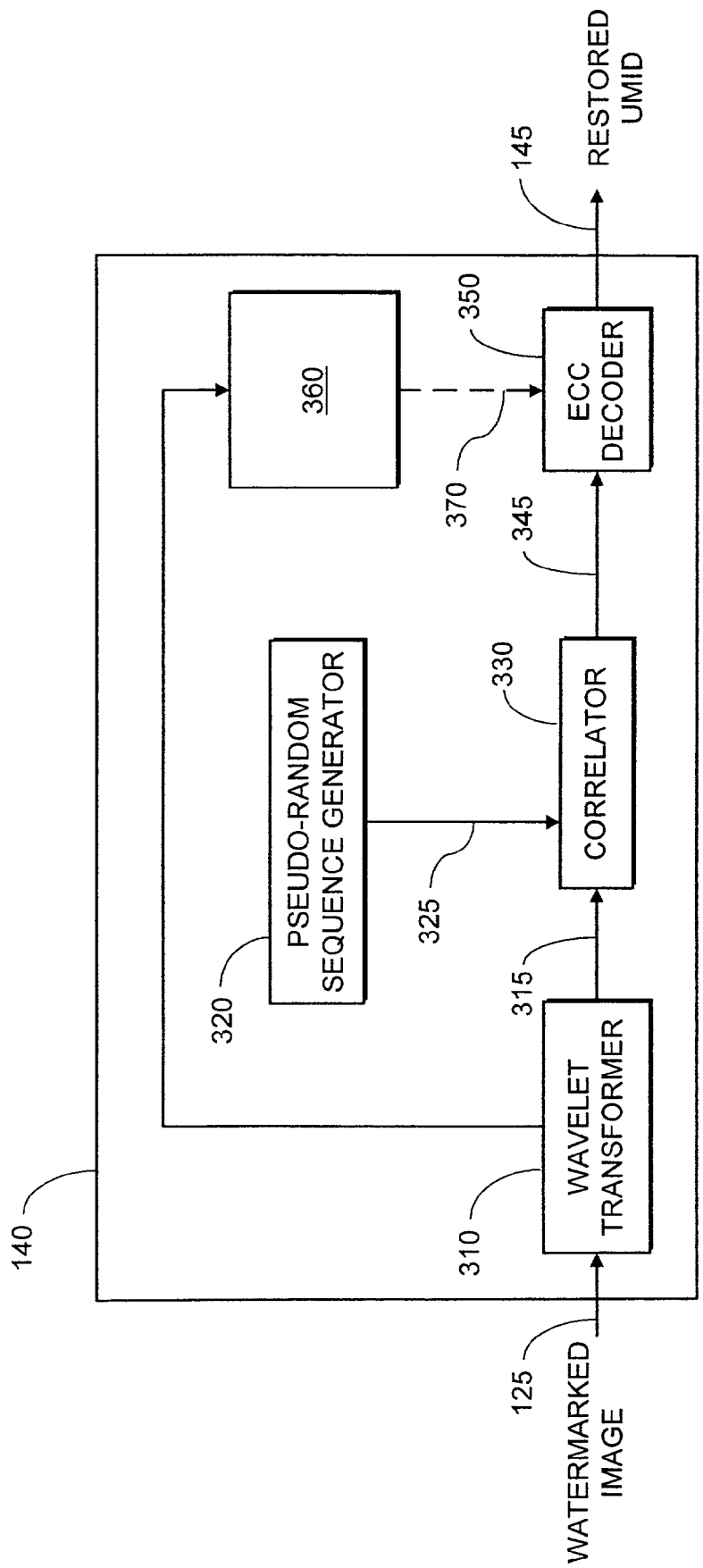
FIG. 7 is a schematic block diagram of a watermark decoder appearing in FIG. 1.
Figure 8:
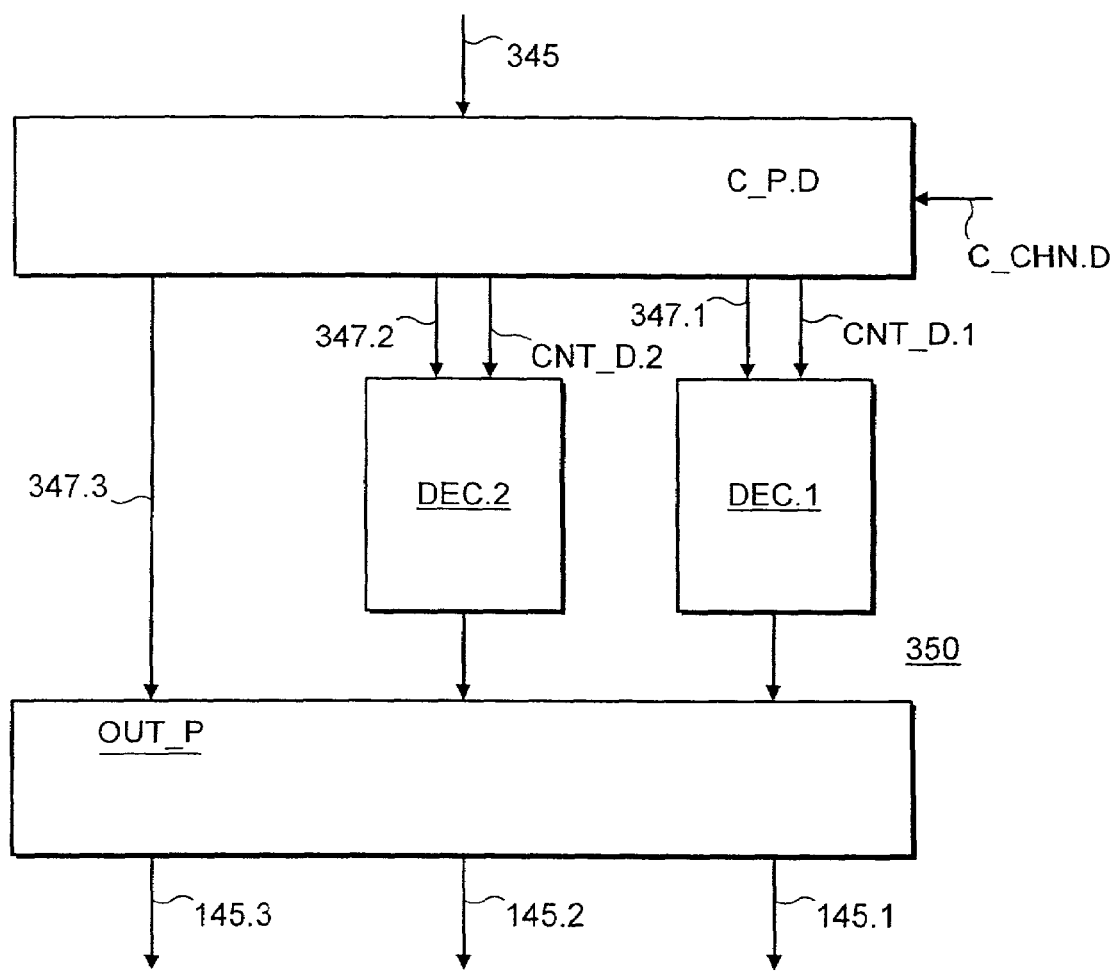
FIG. 8 is a schematic block diagram of an error correction decoder forming part of the watermark decoder shown in FIG. 7.

A diagram representing an example implementation of the error correction decoder 350 is shown in FIG. 8 where parts also appearing in FIGS. 7 and 1 bear the same numerical references. Generally, it will be appreciated that the decoder shown in FIG. 8 operates to perform a reverse of the encoding performed by the encoder shown in FIG. 3. Accordingly, the recovered embedded data stream from the correlator 330 is fed to a control processor C_P.D from the control channel 345. In accordance with the predetermined order and importance with which the three data types were encoded, the control processor C_P.D separates the encoded data items corresponding to each of the three meta data types and feeds these respectively to the connecting channels 347.1, 347.2, 347.3. The first, second and third encoded data items are then fed respectively to a first decoder DEC.1, a second decoder DEC.2 and for the third data items for the third meta data type the data is fed directly to an output processor OUT_P, because this was not encoded. The first and second decoders DEC. 1, DEC.2 operate to decode the encoded data items using a decoding algorithm suitable for the error correction code applied by the first and second encoders ENC. 1, ENC.2 of the encoder 200 shown in FIG. 3. The recovered data items are then fed to the output processor OUT_P and output on respective output channels 145.1, 145.2, 145.3.

For the example arrangement in which the encoding applied by the encoder 200 shown in FIG. 3 is set dynamically by the control processor, the recovered data stream fed on connecting channel 345 will include control information. The control information provides an indication of the error correction code used for the respective first and second meta data items. Correspondingly, the control information also provides an indication of where each of the encoded data items is positioned within the recovered data stream. According to this embodiment therefore the control processor C_P.D provides control signals on control channels CNT_D.1, CNT_D.2 to indicate to the first and second decoders which decoding process to use. The decoding process may be adapted, or a different decoding process may be used in accordance with the error correction code used by the encoders ENC.1, ENC.2 to encode the data items.

Further Example Implementations of the First Embodiment

Figure 9:
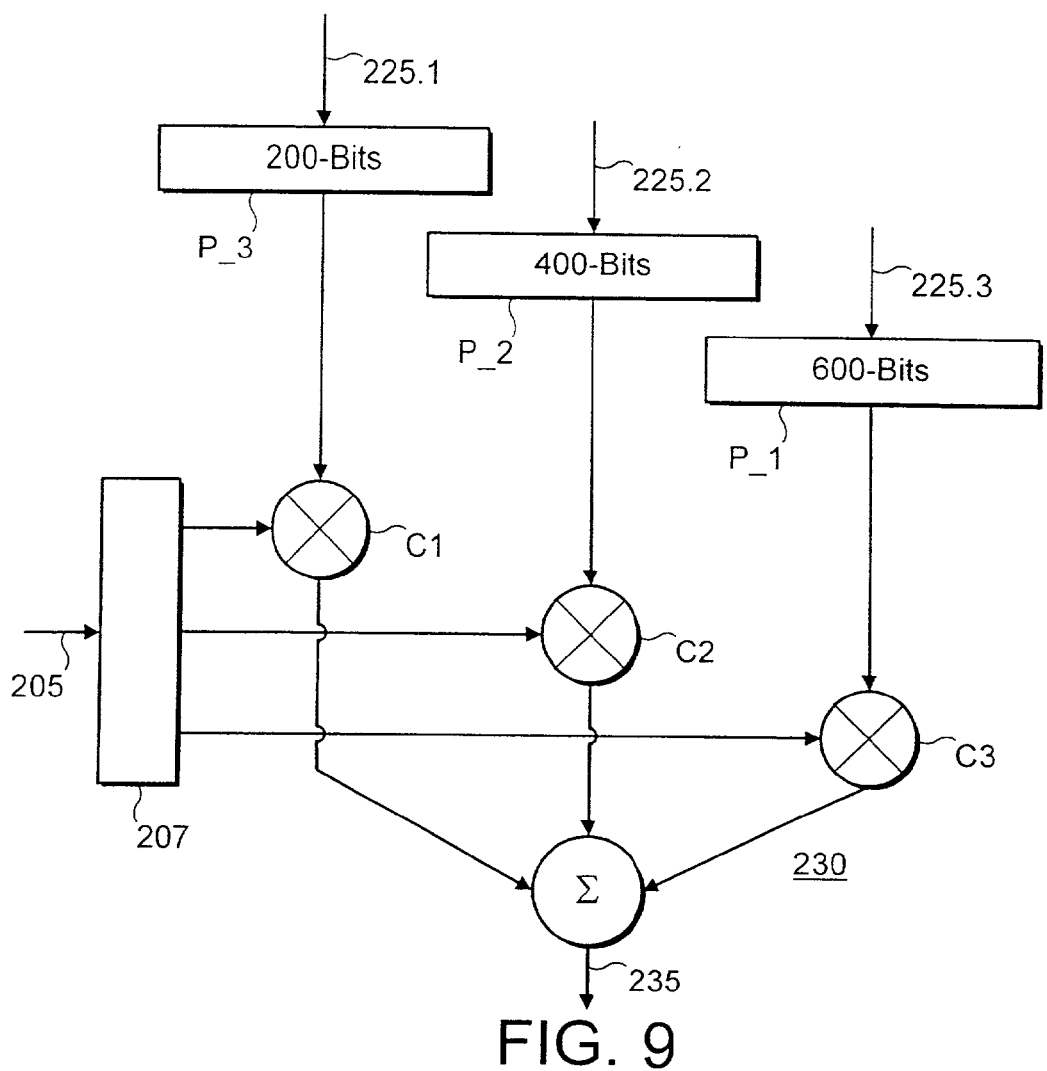
FIG. 9 is a schematic representation of a modulator forming part of the combiner shown in FIG. 2, in accordance with a further embodiment of the present invention.

In an alternative embodiment, the different meta data types may be embedded in accordance with their relative importance using different PRBSs. An example of an implementation of the combiner 230 which operates in order to embed the data in accordance with the relative importance of each meta data type is shown in FIG. 9. In FIG. 9 three parallel connecting channels 225.1, 225.2, 225.3 from the pseudo random sequence generator 220 are shown to generate respectively first, second and third PRBSs. The data from the encoder is received via the connecting channel 205 at a de-multiplexing processor 207. For this example illustration it is assumed that the three meta data types are fed from the error correction encoder generator 200 in a multiplexed form so that the de-multiplexer 207 operates to separate the data items corresponding to the three meta data types. For the present example embodiment it is assumed that the error control encoder 200 is applying the same error correction code to each of the three data types, although it will be appreciated that in alternative embodiments, different codes could be used as for the first embodiment.

The encoded data items for each of the three data types are fed separately to respective correlators C1, C2, C3. The relative importance of the three meta data types is assumed to increase going from left to right for the correlators C1, C2, C3. Each correlator receives the respective PRBS and modulates the PRBS in accordance with the data symbols of the encoded data items.

As illustrated in FIG. 9 the most important meta data items are provided with the longest PRBS P_1 of 600-bits so that the data bits of the first meta data type are spread by the greatest amount. Correspondingly, for the second meta data type the next longest PRBS P_2 of 400-bits is provided so that the symbols of the second meta data type are spread by a correspondingly reduced amount. For the least important data type only, a PRBS P_3 of only 200-bits is used providing the smallest amount of spreading. The modulated PRBSs from each of the three combiners C1, C2, C3 are then combined together by an adder ADD.

By combining the modulated PRBSs together, a composite signal CS is produced which effectively provides a spread spectrum signal for each of the three meta data types. The composite signal is then combined with the image by the combiner 240 shown in FIG. 2 as already explained.

Figure 10:
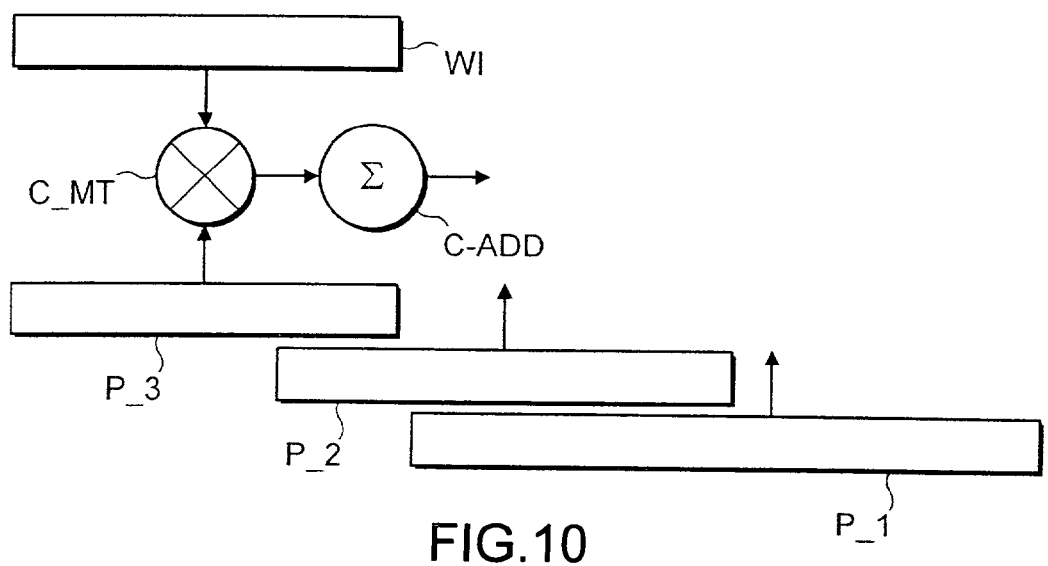
FIG. 10 provides a schematic representation of the operation of the correlator forming part of the watermark decoder shown in FIG. 7, according the further embodiment of the invention.

The three meta data types may be recovered from the image by the correlator 330 in the decoder 140 as already explained with reference to the FIG. 8. However in order to detect and separate the three meta data types, the correlator of FIG. 8 is adapted to the effect that the three PRBSs P_1, P_2, P_3 are correlated separately with the transform domain image in order to recover the first, second and third meta data types respectively. This is represented in FIG. 10 where each of the three PRBSs P_1, P_2, P_3 are correlated with the image data symbols WI to which the spread spectrum encoded data has been added, to extract the three types of meta data item. The correlation is represented schematically by the multiplier C_MT and an adder C_ADD. For the case of the first most important data, the longest PRBS P_1 will produce a higher correlation result than the second or third PRBSs, thereby increasing the likelihood of detecting the first meta data type, with respect to the second and third meta data types. Correspondingly, the second meta data type will be more likely to be recovered correctly than the third meta data type.

It will be appreciated that the spread spectrum encoding of the data to be embedded can be considered to represent a limitation on the amount of data which can be embedded in this way. This is because the other modulated PRBSs represent noise to a wanted PRBS. Provided the noise is not so high as to mask a correlation output result when the correct PRBS aligns with the PRBS used to embed the data, the data can be recovered. Therefore a maximum number of PRBSs which can be added together but from which the embedded data can still be recovered from the correlation of the wanted PRBS with the embedded data can be considered to represent a limited capacity for embedding data. Accordingly, the length or number of PRBSs allocated for each of the respective data types can be determined in accordance with their relative importance. In alternative embodiments, the data may also be encoded by the error correction encoder to provide a different amount of redundancy per data type which are then combined with separate PRBSs in accordance with importance.

Decoder According to a Second Embodiment

Figure 11:
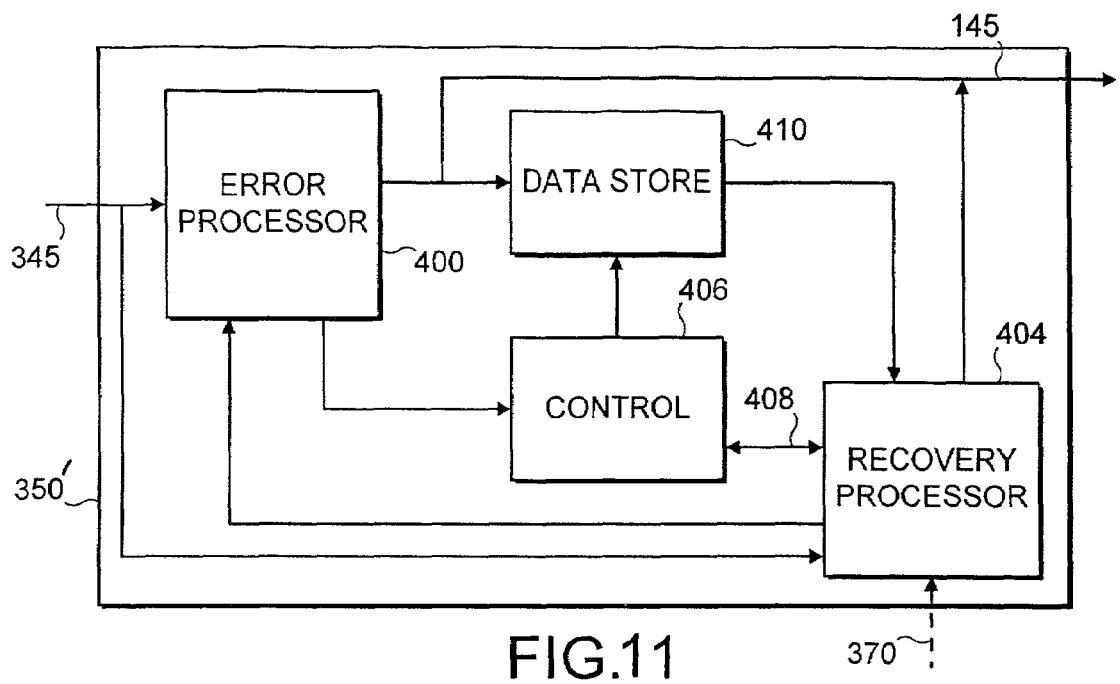
FIG. 11 is a schematic block diagram of an error correction decoder according to a further embodiment of the present invention.

FIG. 11 provides a more detailed block diagram of the error correction decoder 350' in accordance with a second example embodiment of the present invention. In FIG. 11 the error correction encoded meta data which have been recovered from the video images by the correlator 335 are received from the connecting channel 345 by an error processor 400. To facilitate explanation of the example embodiment of the present invention, the meta data items will be assumed to be UMIDs. The encoded UMIDs are also received from the connecting channel 345 by a recovery processor 404.

Returning to FIG. 6, the purpose of the analysis processor 360 shown in FIG. 6 will now be explained. The analysis processor is optionally provided to assist the recovery processor 404 in determining whether the data fields of the errored UMID should be replaced with the value of the data fields from the previous UMID−1 or the subsequent UMID+1 UMIDs. To this end the analysis processor 360 is arranged to compare the content of the watermarked images from which the previous and subsequent UMIDs were recovered, as well as the image from which the errored UMID was detected and recovered. The analysis processor 360 is arranged to generate signals indicative of a comparison between the content of the image from which the errored UMID was recovered with the content of the image from which the previous and/or subsequent UMIDs UMID−1, UMID+1 were recovered. The comparison can be performed by for example generating a histogram of the colour in the images. The signals representative of this comparison are fed to the recovery processor via a connecting channel 370.

The recovery processor uses the signals representing the comparison of the image content to determine whether the data fields of the errored UMID should correspond to the previous UMID−1 or the subsequent UMID+1. Accordingly, for example, where the content of the image from which the errored UMID was recovered is determined from the comparison to be more similar to the content of the image from which the previous UMID was recovered UMID−1, then the data fields of the UMID should be replaced with data values derived from the previous UMID. For example, the data field which is representative of the clip ID should be replaced with the clip ID from the previous UMID−1.

The error processor 400 operates to perform an error detection and/or correction process in order to attempt to recover the UMID.

It is known that an error correction code can correct a certain number of errors and detect a certain number of errors, the number of errors which can be detected being generally greater than the number that can be corrected. Thus in general the ability of an error correction code to detect errors is greater than the ability of a decoder to correct these errors.

The number of errors in the recovered encoded UMID may be too great for the UMID to be recovered from error correction decoding. However the error processor has a facility for detecting whether error correction is possible. For the example BCH code, a decoding process for the BCH code can provide an indication that error correction is not possible, when error correction is applied.

Alternatively, the error processor 400, may first perform an error detection process, in order to detect the number of errors in the encoded UMID. If the number of errors is greater than a predetermined threshold the encoded UMID is determined to be unrecoverable because the encoded UMID has too many errors. The predetermined threshold is set to reduce the likelihood of falsely decoding an encoded UMID as a result of the number of errors being greater than the number which can be decoded by the error correction code. Typically, the threshold may be set in accordance with a compromise between a number of errors which can be corrected by error correction decoding, and reducing the likelihood of a number of errors being so large as to be incorrectly decoded.

If an encoded UMID is declared as being too errored, a control processor 406 controls the recovery processor 404 via a control channel 408 to perform a recovery process on the errored UMID to attempt to recover the UMID.

If the error processor 400 determines that the number of errors present in the encoded UMID is recoverable using error correction decoding, then the control processor 406 controls the error processor 400 to decode the encoded UMID to provide a recovered version of the UMID which is output from the output channel 145. This recovered UMID however is also stored under control of the control processor 406 within a data store 410.

Figure 12:
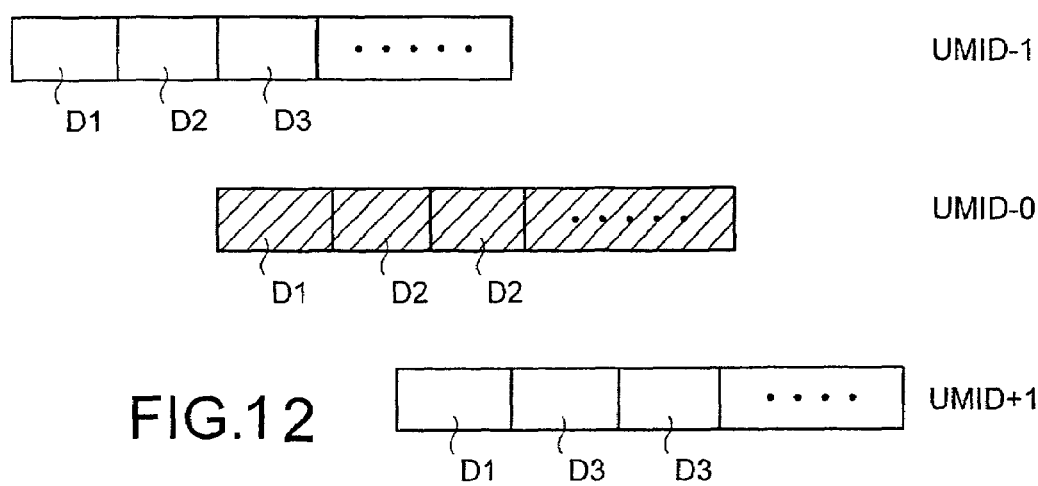
FIG. 12 provides an illustrative representation of a process of recovering data items, performed by a recovery processor forming part of the error correction decoder shown in FIG. 11.

Returning to the operation of the recovery processor 404, the embodiment of the present invention shown in FIG. 11 utilises the nature of the systematic error correction code used to encode the UMID. As shown in FIG. 4 the UMID as source data appears as part of the encoded code word. As such, the recovery processor has access to the UMID albeit in a form in which there are errors present. The recovery processor may store the errored UMID locally until a subsequent UMID has been decoded and recovered and stored in the data store 410. Accordingly, the recovery processor may then compare the data fields of the UMID for one or both of a previous successfully decoded UMID and a subsequent successfully decoded UMID. This is represented in FIG. 12 where UMID−1 and UMID+1 are representative of successfully recovered previous and subsequent UMIDs, which are shown with the present UMID 0. As represented by hashed sections, the present UMID 0 is deemed not recoverable.

In order to recover the data from the UMID, the recovery processor 404 compares the values in the data field of the UMID. The UMID may include a clip ID which identifies the clip or take of the video images (clip ID) in which the UMIDs have been embedded. Accordingly, for example the first data field D1 may represent the clip ID. If the clip ID D1 is the same in UMID−1 and UMID+1, then it is likely that data field D1 of the UMID 0 which can not be recovered should be the same as the clip ID in UMID−1 and UMID+1. Therefore the recovery processor compares data field D1 of UMID−1 and UMID+1 and if these are the same it sets data field D1 of the UMID0 to this value.

At this point, the control processor may then attempt to decode the adapted encoded UMID. This is because if the number of errors still present in the encoded UMID after the first data field D1 has been replaced, is less than a number which can be correctly decoded, then the error correction code can be used to recover the UMID. If this number is less than the predetermined threshold, the adapted encoded UMID in which the data field D1 has been replaced is fed to the error processor 400. The error processor as before determines whether the encoded UMID can be recovered by error correction decoding, thereby recovering the rest of the UMID including the second and third data fields D2, D3.

Alternatively, or if the adapted encoded UMID still cannot be decoded, after having replaced the first data field D1, the second and third data fields D2 and D3 may be compared by the recovery processor 404 for the previous and subsequent UMIDs. The data field D2 may be for example a time code. As such, and because each UMID has been embedded in successive frames of the video images, it can be expected that the data in the second data field D2 will linearly increase between successive UMIDs. Therefore the recovery processor compares the second data fields D2 and if these are different by less than a predetermined threshold then the data field D2 of the errored encoded UMID 0 is calculated by interpolating between the data values in the second data fields D2 of the previous and subsequent UMIDs. Accordingly, after replacing the second data field D2, the control processor 406 may then feed the recovered encoded UMID with the redundant data to the error processor 400 and attempt to decode the UMID once again, or simply output the UMID as recovered.

If when comparing the second data fields D2, the data fields of the previous and subsequent UMIDs differ by an amount greater than the predetermined threshold, then it may be assumed that the UMID recovered from the previous or the subsequent image frame relates to a separate video clip. As such the data field or indeed the UMID as a whole is either replaced by the corresponding field from the earlier or subsequent recovered UMIDs. In order to determine whether the previous or the subsequent UMID corresponds to the same video clip, as the UMID 0 being recovered, the content of the video images of the previous and subsequent frames are compared, with the image from which the UMID 0 is being recovered as will be explained shortly. Accordingly, the second data field D2 of the UMID to be recovered is set to the same value as the second data field D2 of the previous UMID or subsequent UMID, decoding may then be re-applied. As a default, the errored UMID can be replaced with the previous UMID.

It will be appreciated that if there exists a correlation between the values of the third data fields D3 of the recovered UMIDs, then this correlation can be used to estimate the value of the third data field D3 of the errored encoded UMID.

After all the data fields of the UMID have been estimated by interpolation or replacement, error correction decoding is again attempted on the encoded UMID. If the encoded UMID is correctable, then the encoded UMID is decoded and output as the recovered UMID. If however the UMID is still not correctable, then the UMID in the adapted form after interpolation is assumed to be correct and output as the recovered UMID. This is because the UMID may have been recovered correctly by interpolation, but because all the errors of the encoded UMID appear in the redundant parity bits, the encoded UMID is still considered to be uncorrectable by the error correction decoder.

Once a UMID has been recovered, either by error correction or by replacement and/or interpolation, then advantageously, the errored bits from the UMID in the watermarked image may be replaced. This provides a watermarked image which is essentially free from errors so that subsequent processing can utilise the watermark, and/or reproduced the watermarked image.

The Universal Material Identifier (UMID)

Figure 13A:
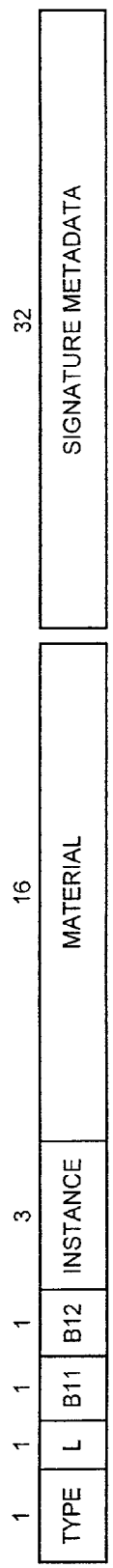
FIGS. 13A and 13B are schematic block diagrams of the structure of an extended and a basic UMID respectively.
Figure 13B:
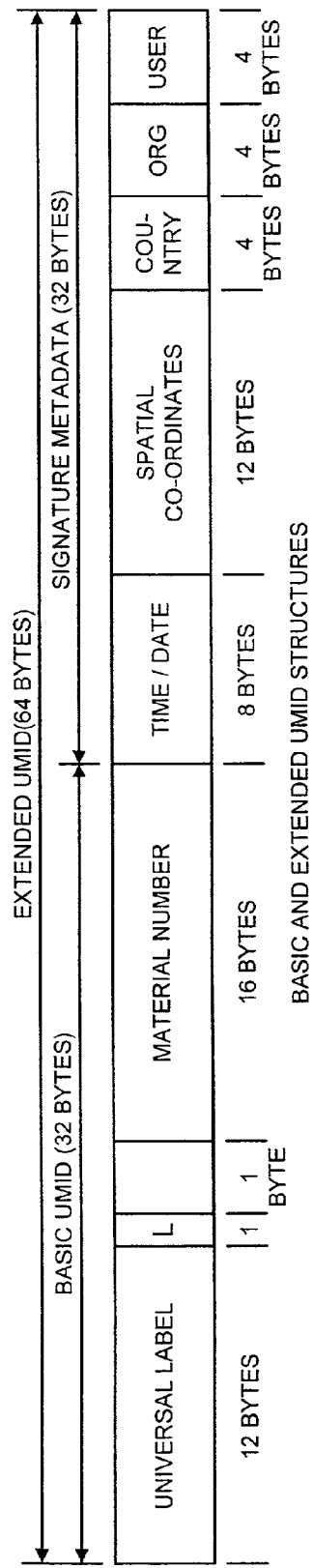

A brief explanation will now be given of the structure of the UMID, with reference to FIGS. 13A and 13B. The UMID is described in SMPTE Journal March 2000. Referring to FIG. 13A an extended UMID is shown to comprise a first set of 32 bytes of a basic UMID, shown in FIG. 13B and a second set of 32 bytes referred to as signature metadata. Thus the first set of 32 bytes of the extended UMID is the basic UMID. The components are:

A 12-byte Universal Label to identify this as a SMPTE UMID. It defines the type of material which the UMID identifies and also defines the methods by which the globally unique Material and locally unique Instance numbers are created.

A 1-byte length value to define the length of the remaining part of the UMID.

A 3-byte Instance number which is used to distinguish between different 'instances' of material with the same Material number.

A 16-byte Material number which is used to identify each clip. Each Material number is the same for related instances of the same material.

The second set of 32 bytes of the signature metadata as a set of packed metadata items used to create an extended UMID. The extended UMID comprises the basic UMID followed immediately by signature metadata which comprises:

An 8-byte time/date code identifying the time and date of the Content Unit creation.

A 12-byte value which defines the spatial co-ordinates at the time of Content Unit creation.

3 groups of 4-byte codes which register the country, organisation and user codes.

More explanation of the UMID structure is provided in co-pending UK patent application number 0008432.7.

In a further embodiment, the application strength with which the PRBSs are added to the wavelet coefficients can be adapted in accordance with relative importance. As such more important data can be given a higher application strength.

In an alternative embodiment, the control processor 238 within the combiner 240 may be arranged to form a plurality of data items into an order of relative importance, and to embed the items selectively in accordance with this order within the limited data embedding capacity provided by the information material. Thus, if the embedding capacity is reached then the data items of lower importance after the more important data items have been embedded within the embedding capacity are queued. As already explained the data items of lower importance are therefore queued by the combining processor until sufficient embedding capacity becomes available for these data items to be embedded. The data embedding capacity may vary dynamically either as a result of a characteristic of the information material, or because the demand to embed more important data items reduces, thereby making more capacity available for the more important data items. The available embedding capacity may be determined by the control processor 238 and used to control the combining processor 237. Data items to be queued may be stored temporarily in a data store (not shown) for this purpose.

The data items may include meta data describing the content or providing an indication of an attribute of said information material in which the data is embedded. The meta data may include for example a Unique Material Identifier (UMID), the UMID being given a higher predetermined relative importance than other meta data.

Various modifications may be made to the embodiments herein before described without departing from the scope of the present invention. Although in this example embodiment, the data to be embedded is added to the image in the transform domain, in alternative embodiments the data could be represented in the transform domain, inverse transformed into the spatial domain, and added to the data in the spatial domain.

The invention claimed is:

1. An apparatus for embedding data in information material, said data including a plurality of data items, said data items having a different relative importance with respect to each other, said apparatus comprising:

an encoding processor operable to encode each of said data, items in accordance with at least one error correction code, said encoded data items including redundant data introduced by said error correction code;

a combining processor operable to combine said encoded data items with said information material; and a control processor operable to receive data indicative of said relative importance of said data items to be embedded and to control said encoding processor and said combining processor to encode and embed said data items in accordance with said relative importance, wherein said combining processor is operable in combination with said encoding processor to allocate an amount of a limited data embedding capacity provided by said information material, to generate an amount of said redundant data included in said encoded data items in accordance with said allocation, each of said data items being encoded and embedded to the effect that a proportion of said limited data embedding capacity is allocated to said encoded data items in accordance with said relative importance, and to embed control information in the information material indicative of at least one of the encoding and embedding applied to said data items.

2. An apparatus as claimed in claim 1, wherein said encoding processor includes a modulator operable to generate predetermined data sequences and to encode said data items by modulating said predetermined data sequences with data symbols of said data items, and to combine said modulated predetermined data sequences with said information material.

3. An apparatus as claimed in claim 2, wherein said predetermined data sequences are Pseudo-Random Symbol or Bit Sequences.

4. An apparatus as claimed in claim 1, wherein said data items include meta data describing the content or providing an indication of an attribute of said information material in which the data is embedded.

5. An apparatus as claimed in claim 4, wherein said meta data includes a Unique Material Identifier (UMID), said UMID being given a higher predetermined relative importance than other meta data.

6. An apparatus as claimed in claim 5, wherein said UMID includes a plurality of data fields each of said fields representing a data item, each of said fields having a different relative importance.

7. An apparatus as claimed in claim 1, wherein said combining processor is operable in combination with said encoding processor not to embed selected data items if said limited capacity has been reached.

8. An apparatus as claimed in claim 1, wherein said information material is an image.

9. An apparatus for embedding data in information material, said data including a plurality of data items, said data items having a different relative importance with respect to each other, said apparatus comprising:
an encoding processor operable to encode each of said data items in accordance with at least one error correction code, said encoded data items including redundant data introduced by said error correction code;
a combining processor operable to combine said encoded data items with said information material in accordance with an application strength; and
a control processor operable to receive data indicative of said relative importance of said data items to be embedded and to control said encoding processor and said combining processor to encode and embed said data items in accordance with said relative importance,
wherein said combining processor is operable in combination with said encoding processor to allocate an amount of a limited data embedding capacity provided by said information material, as each of said data items being encoded and embedded to the effect that said proportion of said limited data embedding capacity and said application strength are allocated to said encoded data items in accordance with said relative importance and to embed control information in the information material indicative of at lead one of the encoding and embedding applied to said data items.

10. An apparatus as claimed in claim 9, wherein said encoding processor includes a modulator operable to generate predetermined data sequences and to encode said data items by modulating said predetermined data sequences with data symbols of said data items, and to combine said modulated predetermined data sequences with said information material.

11. An apparatus as claimed in claim 10, wherein said predetermined data sequences are Pseudo-Random Symbol or Bit Sequences.

12. An apparatus as claimed in claim 9, wherein said data items include meta data describing the content or providing an indication of an attribute of said information material in which the data is embedded.

13. An apparatus as claimed in claim 12, wherein said meta data, includes a Unique Material Identifier (UMID), said UMID being given a higher predetermined relative importance than other meta data.

14. An apparatus as claimed in claim 13, wherein said UMID includes a plurality of data fields each of said fields representing a data item, each of said fields having a different relative importance.

15. An apparatus as claimed in claim 9, wherein said combining processor is operable in combination with said encoding processor not to embed selected data items if said limited capacity has been reached.

16. An apparatus as claimed in claim 9, wherein said information material is an image.

17. An apparatus for embedding data in information material, said data including a plurality of data items, said data items having a different relative importance with respect to each other, said apparatus comprising:
an encoding processor operable to encode each of said data items;
a combining processor operable to combine said encoded data items with said information material, encoding processor including a modulator operable to generate predetermined data sequences and to encode said data items by modulating said predetermined data sequences with data symbols of said data items, and to combine said modulated predetermined data sequences within a limited data embedding capacity provided by said information material; and
a control processor operable to receive data indicative of said relative importance of said data items to be embedded and to control said encoding processor and said combining processor to encode and embed said data items in accordance with said relative importance,
wherein said predetermined data sequences are allocated to the effect that a greater amount of spreading of said data items is provided to the more important data items in accordance with said limited data embedding capacity and the control processor is operable to embed control information in the information material indicative of at least one of the encoding and embedding applied to said data items.

18. An apparatus as claimed in claim 17, wherein said predetermined data sequences are Pseudo-Random Symbol or Bit Sequences.

19. An apparatus as claimed in claim 17, wherein said data items include meta data describing the content or providing an indication of an attribute of said information material in which the data is embedded.

20. An apparatus as claimed in claim 17, wherein said meta data includes a Unique Material Identifier (UMID), said UMID being given a higher predetermined relative importance than other meta data.

21. An apparatus as claimed in claim 17, wherein said UMID includes a plurality of data fields each of said fields representing a data item, each of said fields having a different relative importance.

22. An apparatus as claimed in claim 17, wherein said combining processor is operable in combination with said encoding processor not to embed selected data items if said limited capacity has been reached.

23. An apparatus as claimed in claim 17, wherein said information material is an image.

24. An apparatus for detecting and recovering data embedded in information material the data including a plurality of data items having a different relative importance with respect to each other, the data having been encoded and embedded in accordance with a different relative importance, an amount of redundant data being included in said encoded data items in accordance with the relative importance, each of said data items being encoded and embedded to the effect that a proportion of said limited data embedding capacity is allocated to said encoded data items in accordance with said relative importance, and the data includes control information indicative of at least one of the encoding and embedding applied to said data items, said apparatus comprising:
  a detection processor operable to detect and to generate a recovered version of said embedded encoded data items from said information material and said control information; and
  a decoding processor operable to decode and to recover said data items in accordance with the encoding applied to said recovered encoded data items according to the relative importance of said data items, wherein said detection processor is operable to detect and to recover said control information, and in accordance with said control information to decode and to recover said data items.

25. A method of embedding data in information material, said data being a plurality of data items each having a different relative importance, said method comprising:
  receiving data indicative of said relative importance of said data items to be embedded;
  encoding each of said data items in accordance with at least one error correction code, said encoded data items including redundant data introduced by said error correction code;
  combining said encoded data items with said information material; and
  controlling the encoding and the combining of said data items to the effect that an amount of said redundant data included in said encoded data items is allocated in accordance with said relative importance to the effect that a proportion of said limited data embedding, capacity is allocated to said encoded data items in accordance with said relative importance; and
  embedding control information in the information material indicative of at least one of the encoding and embedding applied to said data items.

26. A method of embedding data in information material, said data being a plurality of data items each having a different relative importance, said method comprising:
  receiving data indicative of said relative importance of said data items to be embedded;
  allocating an amount of a limited data embedding capacity provided by said information material in accordance with an application strength;
  encoding each of said data items in accordance with at least one error correction code, said encoded data items including redundant data introduced by said error correction code, an amount of said redundant data included in said encoded data items being allocated in accordance with said relative importance;
  combining said encoded data items with said information material; and
  embedding control information in the information material indicative of the encoding and embedding applied to said data items,
  wherein said allocating and generating has an effect that a proportion of said limited data embedded capacity is allocated to said encoded data items in accordance with said relative importance, and said application strength are allocated to said encoded data items in accordance with said relative importance.

27. A method of embedding data in information material, said data being a plurality of data items each having a different relative importance, said method comprising:
  receiving data indicative of said relative importance of said data items to be embedded;
  allocating an amount of a limited data embedding capacity provided by said information material in accordance with said relative importance,
  encoding each of said data items in accordance with at least one error correction code, said encoded data items including redundant data introduced by said error correction code, an amount of said redundant data, included in said encoded data items being allocated in accordance with said relative importance;
  generating predetermined data sequences;
  encoding said data items by modulating said predetermined data sequences with data, symbols of said data items,
  combining said modulated predetermined data sequences with said information material, and
  embedding control information in the information material indicative of at least one of the encoding and embedding applied to said data items,
  wherein said predetermined data sequences are allocated to the effect that a greater amount of spreading of said data items is provided to the more important data items in accordance with said limited data embedding capacity.

28. A method of embedding data in information material, said data being a plurality of data items each having a different relative importance, said method comprising:
  receiving data indicative of said relative importance of said data items to be embedded;
  encoding each of said data items;
  combining said encoded data items with said information material within a limited data embedding capacity provided by said information material, said encoding and said combining of said data items being performed in accordance with said received relative importance of said data items, to the effect that a proportion of said limited data embedding capacity is allocated to said data items in accordance with said relative importance; and
  embedding control information indicative of at least one of the encoding and embedding applied to said data items.

29. A method of detecting and recovering data embedded in information, material said data being a plurality of data items each having a different relative importance, the data having been encoded and embedded in said information material within a limited data embedding capacity provided by said information material to the effect that a proportion of said limited data embedding capacity is allocated to said data items in accordance with said relative importance, and the embedded data also including control information indicative of at least one of the encoding and embedding applied to the data items, said method comprising detecting the control information indicative of at least one of the encoding and embedding applied to the data items;

detecting said embedded encoded data items from said information material to generate a recovered version of said encoded data items; and decoding said encoded data items using the control information to generate a recovered version of said data items in accordance with the encoding applied to said encoded data items according to the relative importance of said data items.

30. An apparatus for embedding data in information material, said data including a plurality of data items, said apparatus comprising:

a combining processor operable to combine said encoded data items with said information material, said information material providing a limited data embedding capacity; and a control processor operable to select said data items in accordance with an order of relative importance and to control said combining processor to embed said selected data items in said information material within said limited data embedding capacity, wherein said control processor selects said data items to the effect that more important data items are embedded before less important data items until said data embedding capacity limit is reached.

31. An apparatus as claimed in claim 30, wherein said data items include meta data describing the content or providing an indication of an attribute of said information material in which the data is embedded.

32. An apparatus as claimed in claim 31, wherein said meta data includes a Unique Material Identifier (UMID), said UMID being given a higher predetermined relative importance than other meta data.

33. An apparatus as claimed in claim 31, wherein said control processor is arranged to queue at least one data item which is not embedded within said limited data embedding capacity until sufficient data embedding capacity within said limit is available, and controls said combining processor to select at least one queued data item and embeds the selected queued data item in said information material.

34. A computer program on a computer readable medium providing computer executable instructions, which when loaded on to a data processor configures said data processor to operate as an apparatus according to claim 1.

35. A computer program on a computer readable medium providing computer executable instructions, which when loaded on to a data processor configures said data processor to operate as an apparatus according to claim 9.

36. A computer program on a computer readable medium providing computer executable instructions, which when loaded on to a data processor configures said data processor to operate as an apparatus according to claim 17.

37. An apparatus for detecting and recovering data embedded in information material, said data comprising a plurality of source data items each having been encoded in accordance with a systematic error correction code to produce encoded data items each comprising the corresponding source data item and redundant data, said encoded data items being embedded in the information material, said apparatus comprising:

an embedded data detector operable to detect and generate a recovered version of said encoded data from said information material;

an error processor, for each of said recovered encoded data items, operable to determine whether said recovered encoded data item is deemed too erroneous, and if not, decoding said encoded data, item to generate a recovered version of said data item;

a data store for storing said recovered version of said data item; and a recovery data processor operable, if said error processor determines that one of said recovered encoded data items is deemed too erroneous, to compare the source data item of said encoded data item, with at least one other source data item from said data store, and to estimate said source data of said item erroneous encoded data item in dependence upon a corresponding value of said at least one other recovered data item.

38. An apparatus as claimed in claim 37, wherein said error processor is operable to determine whether each of said recovered encoded data items is erroneous by estimating the number of erroneous data symbols in each of said recovered encoded data items, and to compare said number of errors with a predetermined threshold, said recovered encoded data item being determined as erroneous if said number of errors is greater than or equal to said threshold.

39. An apparatus as claimed in claim 38, wherein each of said source data items comprises a plurality of data fields, and said recovery processor is operable to compare at least one of said data fields of said erroneous encoded data item with the corresponding field of said at least one other recovered data item, and to replace said at least one of said fields of said erroneous encoded data item with the corresponding field of said recovered data item in accordance with said comparison.

40. An apparatus as claimed in claim 39, wherein said recovery processor is operable, in dependence upon at least one of said data fields of said source data item being replaced, to determine in combination with said error processor whether said recovered encoded data item in which the data held is replaced is deemed to be too erroneous, and if not, decoding said encoded data item to form a recovered version of said data item.

41. An apparatus as claimed in claim 39, wherein said recovery processor is operable, if said corresponding data field of a previous and a subsequent data items have the same value, to set said data field of said erroneous encoded data item to the value of one of said previous and subsequent data items.

42. An apparatus as claimed in claim 39, wherein said recovery processor is operable, if said corresponding data field of a previous data item and a subsequent data item have different values, to replace said data field of said erroneous encoded data item with a value formed by interpolating between said previous and subsequent data items.

43. An apparatus as claimed in claim 39, wherein said recovery field of a previous data item and said corresponding data field of a subsequent data item, and if said difference is above a predetermined threshold to replace said data field of said erroneous encoded data item which cannot be decoded with the value of said field of said previous data item and otherwise to form said replacement value by interpolating between said field of said previous and subsequent data items.

44. An apparatus as claimed in claim 39, comprising an analysis processor operable to compare the content of the information material from which a previous data item, a subsequent data item and said erroneous encoded data items were detected, and to generate data representative of the comparison, wherein said recovery processor is, operable to replace said data field of said erroneous encoded data item which cannot be decoded with the value of said data field from one of said previous and said subsequent data items in dependence upon said comparison data.

45. An apparatus as claimed in claim 44, wherein said analysis processor is arranged to estimate the content of the information material from a color histogram or the like.

46. An apparatus as claimed in claim 37, wherein said recovery processor is operable to compare sand source data item from said erroneous encoded data item with at least one of a previous and a subsequent decoded and recovered data item, and to replace said source data item of said erroneous encoded data item in accordance with at least one of said previous and subsequent source data items.

47. An apparatus as claimed in claim 46, wherein said recovery processor is operable, if said previous and said subsequent source data items have the same value to replace said source data item of said erroneous encoded data item with the value of said previous or subsequent data items.

48. An apparatus as claimed in claim 46, wherein said recovery processor is operable, if said previous and said subsequent source data items have different values to replace said source data item of said erroneous encoded data item with the value formed by interpolating between said previous and subsequent data items.

49. An apparatus as claimed in claim 37, comprising an analysis processor operable to compare the content of the information material from which a plurality of recovered source data items and said erroneous encoded data item have been detected, and to generate data representative of the comparison, wherein said recovery processor is operable to estimate said source data item of said erroneous encoded data item in dependence upon said data representative of said comparison.

50. An apparatus as claimed in claim 37, wherein said information material is at least one of video, audio, data or audio/video material, and said source data items include meta data describing the content or attributes relating to said video, audio, data or audio/video material.

51. An apparatus as claimed in claim 50, wherein said data items include Unique Material Identifiers (UMIDs), and said data fields are the fields of said UMID, and said encoded data items are encoded UMIDs.

52. An apparatus as claimed in claim 51, wherein the data field of an erroneous encoded UMID, which is recovered by interpolating contains data representative of the time code of said UMID.

53. An apparatus as claimed in claim 48, wherein the data field of an erroneous encoded UMID, which is recovered by replacing the data field with data from the corresponding field of the previous encoded UMID, consequent upon a difference between the data, fields of the previous and subsequent recovered UMIDs being above a predetermined threshold is representative of a clip identifier of said UMID.

54. A system for embedding and removing data from information material, said system comprising:
an apparatus for embedding the data into the information material, said data comprising a plurality of source data items, said apparatus for embedding comprising:
an error correction encoder operable to encode each of said data items in accordance with a systematic error correction code to produce encoded data items each comprising the source data item and redundant data; and
a combining processor operable to combine said encoded data items with said information material; and an apparatus for detecting and removing the data from the information material, said apparatus for detecting and recovering comprising:
an embedded data detector operable to detect and generate a recovered version of said encoded data from said information material;
an error processor operable; for each of said recovered encoded data items, to determine whether said recovered encoded data item is deemed too erroneous, and if not decoding said encoded data item to generate a recovered version of said data item;
a data store for storing said recovered version of said data item; and
a recovery data processor operable, if said error processor determines that one of said recovered encoded data items is deemed too erroneous, to compare the source data item of said encoded data item, with at least one other source data item from said data store, and to estimate said source data item of said erroneous encoded data item in dependence upon a corresponding value of said at least one other recovered data item.

55. A method of detecting and recovering data embedded in information material, said data comprising a plurality of source data items each having been encoded in accordance with a systematic error correction code to produce encoded data items, each encoded data, item comprising the corresponding source data item and redundant data, said encoded data items being embedded in the information material, said method comprising:
detecting and generating a recovered version of said encoded data items from said information material;
determining, for each of said encoded data items, whether the recovered version of said encoded data item is deemed too errored, and
if not, decoding said encoded data item to generate a recovered version of said data item, and storing said recovered version of said data item, and
if said erroneous encoded data item is deemed too erroneous, comparing said source data from said erroneous encoded data item with at least one other source data item from said data store, and estimating said source data item of said erroneous encoded data item in dependence upon a corresponding value of said other recovered data item.

56. A computer program on a computer readable medium providing computer executable instructions, which when loaded on to a data processor configures said data processor to operate as an apparatus according to claim 37.

57. An apparatus for embedding data in information material, said data being a plurality of data items each having a different relative importance, said apparatus comprising:
means for receiving data indicative of said relative importance of said data items to be embedded;
means for allocating an amount of a limited data embedding capacity provided by said information material;
means for encoding each of said data items in accordance with at least one error correction code, said encoded data items including redundant data introduced by said error correction code, an amount of said redundant data included in said encoded data items being allocated in accordance with said relative importance;
means for controlling the means for encoding and the means for combining of said data items in accordance with said relative importance to the effect that an amount of said redundant data included in said encoded data items is allocated in accordance with said relative importance to the effect that a proportion of said limited data embedding capacity is allocated to said encoded data items in accordance with said relative importance;

means for combining said encoded data items with said information material; and means for embedding control information in the information material indicative of at least one of the encoding and embedding applied to said data items, wherein said allocating and generating has an effect that a proportion of said limited data embedding capacity is allocated to said encoded data items in accordance with said relative importance.

58. An apparatus for embedding data in information material, said data being a plurality of data items each having a different relative importance, said apparatus comprising:

means for receiving data indicative of said relative importance of said data items to be embedded;

means for allocating an amount of a limited data embedding capacity provided by said information material in accordance with an application strength;

means for encoding each of said data items in accordance with at least one error correction code, said encoded data items including redundant data introduced by said error correction code, an amount of said redundant data included in said encoded data items being allocated in accordance with said relative importance;

means for combing said encoded data items with said information material;

means for embedding control information in the information material indicative of at least one of the encoding and embedding applied to said data items, wherein said allocating and generating has an effect that a proportion of said limited data embedding capacity is allocated to said encoded data items in accordance with said relative importance and said application strength are allocated to said encoded data items in accordance with said relative importance.

59. An apparatus for embedding data in information material, said data being a plurality of data items each having a different relative importance, said apparatus comprising:

means for receiving data indicative of said relative importance of said data items to be embedded;

means for allocating an amount of a limited data embedding capacity provided by said information material;

means for encoding each of said data items in accordance with at least one error correction code, said encoded data items including redundant data introduced by said error correction code, an amount of said redundant data included in said encoded data items being allocated in accordance with said relative importance;

means for generating predetermined data sequences;

means for encoding said data items by modulating said predetermined data sequences with data symbols of said data items; and means for combining said modulated predetermined data sequences with said information material, wherein said predetermined data sequences are allocated to the effect that a greater amount of spreading of said data items is provided to the more important data items in accordance with said limited data embedding capacity.

60. An apparatus for embedding data in information material, said data being a plurality of data items each having a different relative importance, said apparatus comprising:

means for receiving data indicative of said relative importance of said data items to be embedded;

means for encoding each of said data items;

means for combining said encoded data items with said information material within a limited data embedding capacity provided by said information material, said encoding and said combining of said data items being performed in accordance with said received relative importance of said data items, to the effect that a proportion of said limited data embedding capacity is allocated to said data items in accordance with said relative importance; and means for embedding control information indicative of at least one of the encoding and embedding applied to said data items.

61. An apparatus for detecting and recovering data embedded in information material, said data being a plurality of data items each having a different relative importance, the data having been encoded and embedded in said information material within a limited data embedding capacity provided by said information material to the effect that a proportion of said limited data embedding capacity is allocated to said data items in accordance with said relative importance, the embedded data also including control information indicative of at least one of the encoding and embedding, applied to the data items, said apparatus comprising:

means for detecting the control information indicative of at least one of the encoding and embedding applied to the data items;

means for detecting said embedded encoded data from said information material to generate a recovered version of said encoded data; and means for decoding said encoded data items using the control information to generate a recovered version of said data items in accordance with the encoding applied to said encoded data items according to the relative importance of said data items.

62. An apparatus for detecting and recovering data embedded in information material, said data comprising:

a plurality of source data items each having been encoded in accordance with a systematic error correction code to produce encoded data items, each encoded data item comprising the corresponding source data item and redundant data, said encoded data items being embedded in the information material, said apparatus comprising:

means for detecting and generating a recovered version of said encoded data items from said information material;

means for determining, for each of said encoded data items, whether the recovered version of said encoded data item is deemed too erroneous;

means for decoding said encoded data item if said encoded data item is not too erroneous, to generate a recovered version of said data item, and storing said recovered version of said data item, and if said erroneous encoded data item is deemed too erroneous; and means for comparing said source data from said erroneous encoded data item with at least one other source data item from said data store, and means for estimating said source data item of said erroneous encoded data item in dependence upon a corresponding value of said other recovered data item.

* * * * *